United States Patent [19]

Hasegawa et al.

[11] Patent Number: 5,384,645
[45] Date of Patent: Jan. 24, 1995

[54] IMAGE ROTATING APPARATUS

[75] Inventors: Ken Hasegawa; Takanori Masui, both of Kanagawa, Japan

[73] Assignee: Fuji Xerox Co., Ltd., Tokyo, Japan

[21] Appl. No.: 960,886

[22] Filed: Oct. 14, 1992

[30] Foreign Application Priority Data

Oct. 15, 1991 [JP] Japan .................................. 3-265959
Jul. 27, 1992 [JP] Japan .................................. 4-199810

[51] Int. Cl.⁶ .............................................. H04N 1/40
[52] U.S. Cl. .................................... 358/444; 358/450; 358/453; 382/46
[58] Field of Search ............... 358/444, 448, 450, 451, 358/452, 453, 404, 403, 400; 382/46; 340/727, 731; 345/126

[56] References Cited

U.S. PATENT DOCUMENTS

| | | | |
|---|---|---|---|
| 4,729,107 | 3/1988 | Hasegawa et al. | 382/46 |
| 4,912,771 | 3/1990 | Komine et al. | 382/46 |
| 4,929,085 | 5/1990 | Kajihara | 382/46 |
| 5,029,018 | 7/1991 | Noso et al. | 358/444 |
| 5,038,218 | 8/1991 | Matsumoto | 358/444 |
| 5,050,225 | 9/1991 | Itoh | 358/448 |
| 5,063,526 | 11/1991 | Hagawa et al. | 382/46 |
| 5,239,388 | 8/1993 | Matsumoto | 382/46 |

FOREIGN PATENT DOCUMENTS

60-81657 5/1985 Japan .
2-235181 9/1990 Japan .

Primary Examiner—Edward L. Coles, Sr.
Assistant Examiner—Fan Lee
Attorney, Agent, or Firm—Finnegan, Henderson Farabow, Garrett & Dunner

[57] ABSTRACT

An image rotating device includes first and second buffer memories to which image data, sequentially fed, are alternately written every m/n lines with respect to bit width n per pixel of the image data and bit width m per word of a page memory. An image data reader alternately reads m/n lines of image data written to the first and second buffer memories from an address designated in accordance with a set rotational angle with one word of the page memory at a time. An image data writer sequentially writes the image data of one word of the page memory to the address of the page memory designed in accordance with a set rotational angle. The image data are sequentially stored in the page memory with the data being rotated in real time.

20 Claims, 23 Drawing Sheets

X-ADDRESS

|  |  | 0H | 1H |  | CE6H | CE7H |
|---|---|---|---|---|---|---|
|  | 0H | 1a | 2a | --- | 3303a | 3304a |
|  | 1H | 1b | 2b | --- | 3303b | 3304b |
| Y-ADDRESS | 2H | 1c | 2c | --- | 3303c | 3304c |
|  |  | ⋮ | ⋮ | ⋮ | ⋮ | ⋮ |
|  | 7H | 1h | 2h | --- | 3303h | 3304h |

FIG. 9

| 3304a | 3304b | --- | 3304g | 3304h | WORD 3304 |
| 3303a | 3303b | --- | 3303g | 3303h | WORD 3303 |
| ⋮ | ⋮ | --- | ⋮ | ⋮ | |
| 2a | 2b | --- | 2g | 2h | WORD 2 |
| 1a | 1b | --- | 1g | 1h | WORD 1 |

PAGE MEMORY

FIG. 10

| 0H | 1H | --- | 19CH |
| 19DH | 19EH | --- | 339H |
| 33AH | 33BH | --- | 4D6H |
| ⋮ | ⋮ | --- | ⋮ |
| 1D6E06 | 1D6E07 | --- | 1D6FA2H |
| 1D6FA3 | 1D6FA4 | --- | 1D713FH |

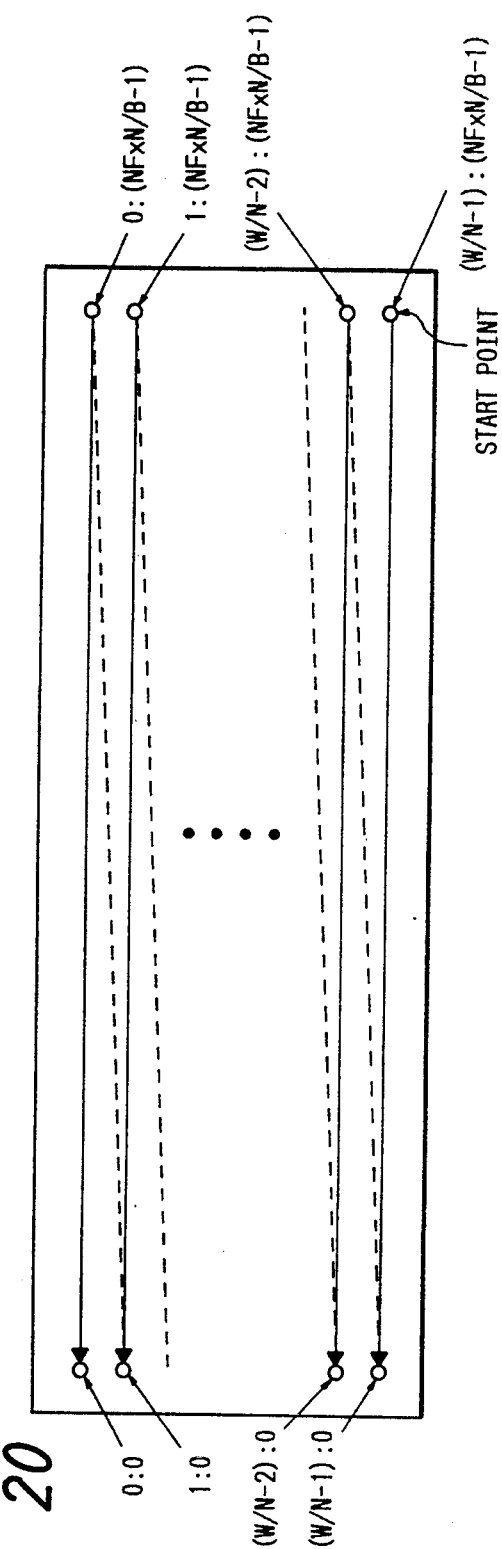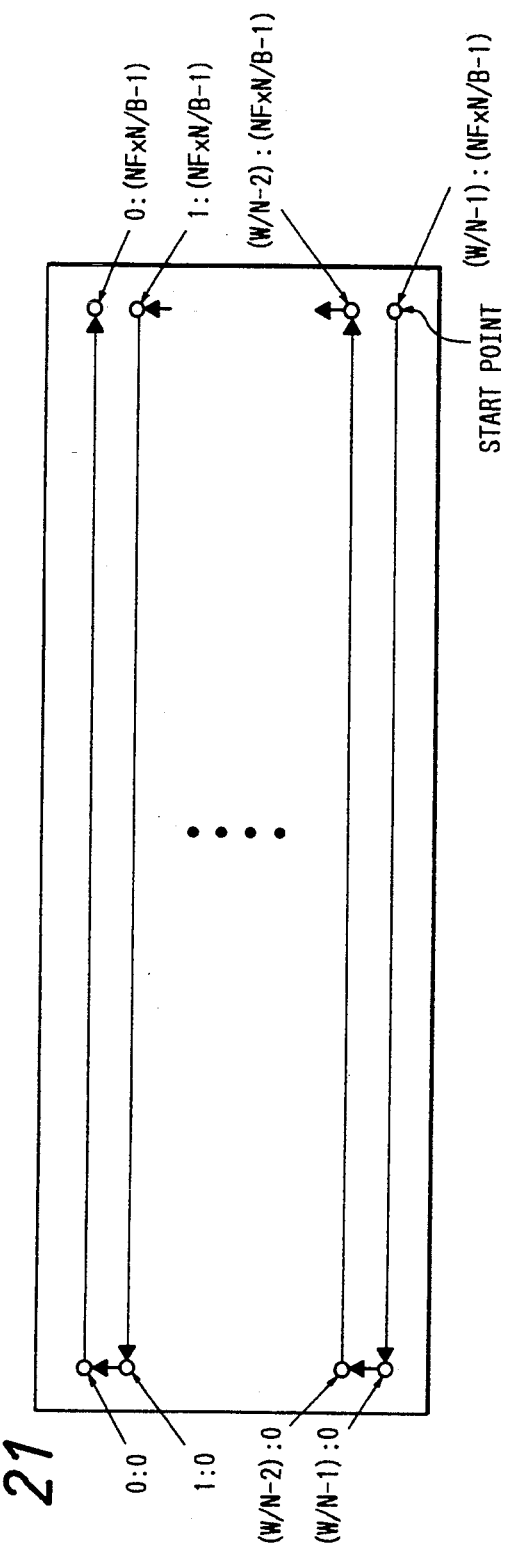

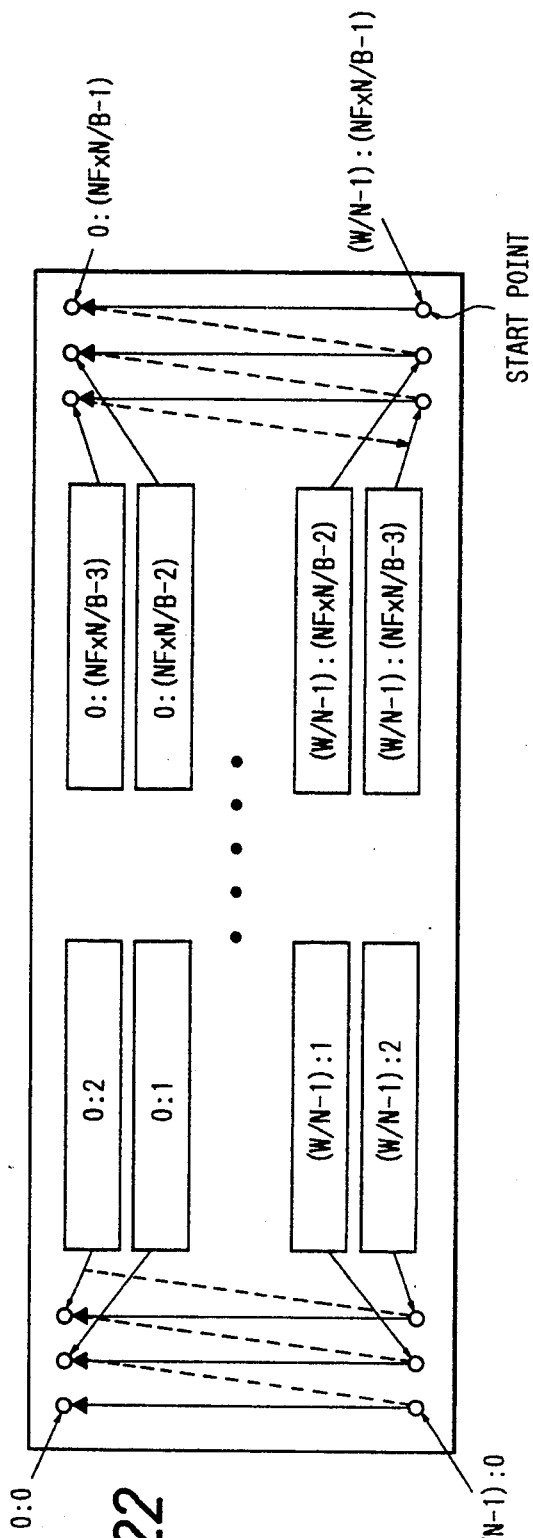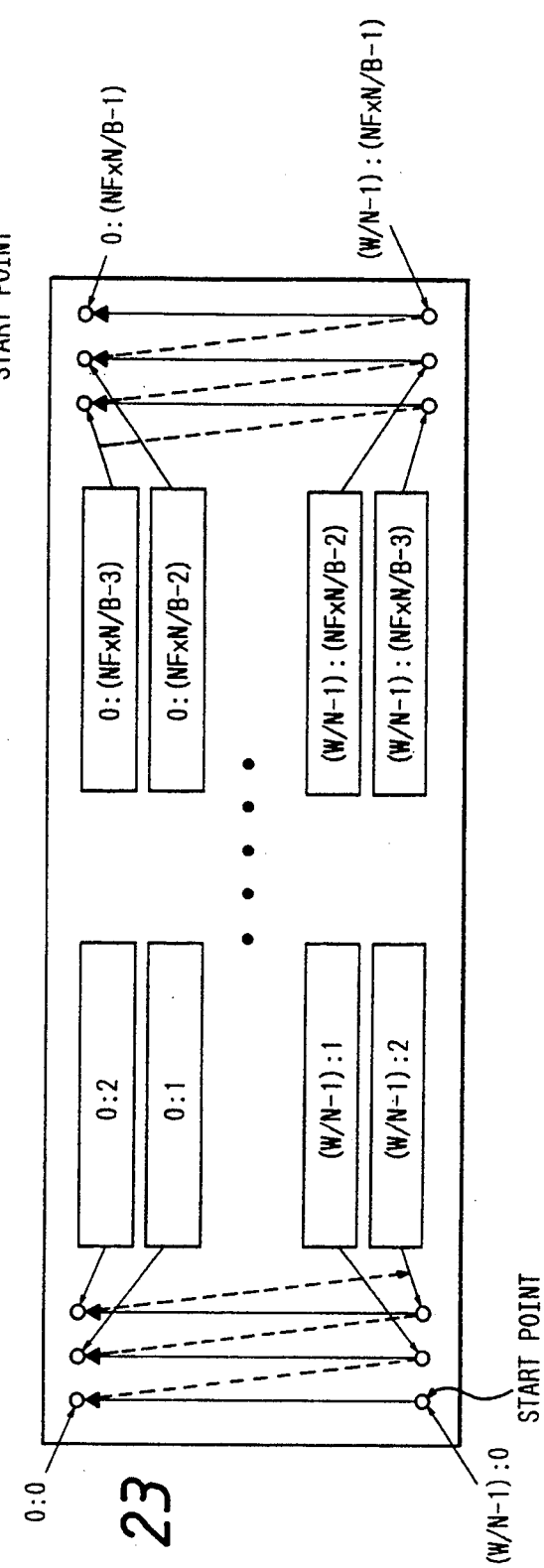

| TIME | INPUT DATA | RA1 | RA2 | RA3 | RA4 | RB1 | RB2 | RB3 | RB4 |
|------|------------|-----|-----|-----|-----|-----|-----|-----|-----|
| 1 | D0, D1 | D0 | D1 | | | | | | |
| 2 | D2, D3 | D0 | D1 | D2 | D3 | | | | |
| 3 | D4, D5 | D0 | D1 | D2 | D3 | D4 | D5 | | |
| 4 | D6, D7 | D0 | D1 | D2 | D3 | D4 | D5 | D6 | D7 |

1202:

| TIME | INPUT DATA | RA1 | RA2 | RA3 | RA4 | RB1 | RB2 | RB3 | RB4 |
|------|------------|-----|-----|-----|-----|-----|-----|-----|-----|
| 1 | D0, D1 | | | D1 | D0 | | | | |
| 2 | D2, D3 | D3 | D2 | D1 | D0 | | | | |
| 3 | D4, D5 | D3 | D2 | D1 | D0 | | D6 | D5 | D4 |
| 4 | D6, D7 | D3 | D2 | D1 | D0 | D7 | D6 | D5 | D4 |

| TIME | INPUT DATA | RA1 | RA2 | RA3 | RA4 | RB1 | RB2 | RB3 | RB4 |
|------|------------|-----|-----|-----|-----|-----|-----|-----|-----|
| 1 | D0, D1 | D0 | | | | D1 | | | |
| 2 | D2, D3 | D0 | D2 | | | D1 | D3 | | |
| 3 | D4, D5 | D0 | D2 | D4 | | D1 | D3 | D5 | |
| 4 | D6, D7 | D0 | D2 | D4 | D6 | D1 | D3 | D5 | D7 |

1204

| TIME | INPUT DATA | RA1 | RA2 | RA3 | RA4 | RB1 | RB2 | RB3 | RB4 |
|------|------------|-----|-----|-----|-----|-----|-----|-----|-----|
| 1 | D0, D1 | | | | D0 | | | | D1 |
| 2 | D2, D3 | | D4 | D2 | D0 | | D5 | D3 | D1 |
| 3 | D4, D5 | | D4 | D2 | D0 | D7 | D5 | D3 | D1 |
| 4 | D6, D7 | D6 | D4 | D2 | D0 | D7 | D5 | D3 | D1 |

IMAGE ROTATING APPARATUS

BACKGROUND OF THE INVENTION

1. Field of the Invention

The present invention relates generally to image processing apparatus and, more particularly, to an image processing apparatus for storing image data in a page memory while rotating the image data sequentially fed by 0°, 90°, 180° or 270° in real time.

2. Prior Art

Heretofore, there has been proposed an apparatus for storing image data in a page memory while rotating the image data sequentially fed by 90° (Japanese Patent Laid-Open No. 235181/1990). In such an apparatus, it has been arranged that one page of a rotated image is ultimately obtained through the steps of reading one word from an address in a page memory including a bit position where image data that have been fed is disposed, designating the bit position in the word, rewriting the data at that bit position by means of the image data thus fed, and writing the rewritten data to the address of the page memory again.

Further, in image processing apparatus, the number of density gradations per pixel is determined by the number of information bits. If the number of information bits is 1, a two-gradation monochromatic image will be reproduced and if it is 2, a variable density four-gradation monochromatic image will be reproduced. Although the number of information bits per pixel is normally fixed, the practice commonly followed is to change the number of information bits for the purpose of image processing in the same image processing apparatus. For instance, when monochromatic binary image data is processed, the number of information bits is set at 1 and when image data having a half tone is processed, the number of information bits is increased. When an image is rotated in such an image processing apparatus, an image rotational process is needed for image data different in the number of information bits per pixel.

Japanese Patent Laid-Open No. 81657/1985, for instance, discloses a system of controlling addresses in a memory by exerting increment/decrement control over a counter as a data control system of an image rotating apparatus. In the control system described in that Gazette, no inconvenience arises as long as the number of information bits representing a pixel is fixed. When the number of information bits per pixel is varied, however, a plurality of address control means are required for each data bit and this tends to make the apparatus complicated. As a result, the process of rotating an image has been impossible to attain only by exerting increment/decrement control over the counter when input images are different in the number of information bits per pixel. Moreover, the image data fed from a scanner and the like has been impossible to rotate in real time before being stored in a page memory.

Moreover, Japanese Patent Laid-Open No. 83153/1960 discloses a data storage unit for rotating an image having a block of N-bit×N-bit at high speed by a cyclic shift. However, it has also been infeasible to rotate image data of one page at high speed by rotating a plurality of blocks collectively because the image data has to be input to this storage unit block to block.

Notwithstanding, the process steps of reading one word from an address in the page memory, rewriting a part of the word by means of the image data that has been fed, and writing the rewritten part to the same address in the page memory again have to be completed each time image data is fed after the image rotating method in the prior art apparatus. For this reason, high-speed processing has been impossible in the aforementioned apparatus since the speed at which the image data is fed cannot be higher than the speed at which the page memory is accessed.

SUMMARY OF THE INVENTION

An object of the present invention is to provide an image rotating apparatus capable of rotating image data by 0°, 90°, 180° or 270° at high speed.

Another object of the present invention is to provide an image rotating apparatus capable of rotating image data in real time even when the speed at which the image data is fed is higher than the speed at which a page memory is accessed.

Still another object of the present invention is to provide an image rotating apparatus which is not only simple in construction but also capable of rotating input images different in the number of information bits per pixel, for instance, both of binary images (the number of information bits N=1) and multiple tone images (the number of information bits N=2).

Still another object of the present invention is to provide an image rotating apparatus for storing input images fed from a scanner and the like by rotating them in real time.

Still another object of the present invention is to provide an image rotating apparatus which is capable of writing/reading a plurality of pixels to and from a buffer memory collectively instead of writing/reading them one by one, which can be formed with a low-speed memory device and which is also compact, less costly and capable of low power consumption.

To accomplish the foregoing objects, an image rotating apparatus according to the present invention comprises an image reading means, a control means for setting an image rotational angle and an image area size, an image rotating means for rotating the image data read and sequentially fed by the image reading means to respective set angles, and a page memory in which the image data thus rotated are accumulated, the image rotating means comprising first and second buffer memories to which each of the m/n lines with respect to bit width n per pixel of the image data and bit width m of one word in the page memory is written, an image data reading means for alternately and sequentially reading m/n lines of image data written to the first or second buffer memory in accordance with the set rotational angle from the designated address in the page memory, word by word every m/n lines, and an image data writing means for sequentially writing one word of image data in the page memory that has been read to the designated address in the page memory in accordance with the set rotational angle.

According to the present invention, the image data sequentially fed are alternately written to the first and second buffer memories, line by line, corresponding to the ratio of bit width per pixel to the bit width of one word in the page memory. A plurality of lines of image data written to the first or second buffer memory are alternately and sequentially read from the designated address in accordance with the set rotational angle, line by line, every one word in the page memory being proportional to the aforementioned ratio. The image data corresponding to the rotational angle is arranged in one word in the page memory and one word of data is written to the designated address in the page memory in accordance with the rotational angle, whereby the image data sequentially fed are stored in the page memory in such a state that the image data has been rotated in real time.

Further, to accomplish the foregoing objects, an image rotating apparatus for storing input image data including N-bit information per pixel in a page memory having W bits in wore width such that the data has been rotated by a predetermined rotational angle according to the present invention comprises a buffer memory having B bits in word width for storing at least W/N lines of the input image data, storage control means for writing/reading input images to/from the buffer memory in the order corresponding to the designated rotational angle and image size, means for combining the image data of W/N of B-bit words read by the storage control means into word data having B/N of W bits in accordance with the designated rotational angle to establish the state of the rotated image data, output control means for outputting the word data having B/N of W bits thus combined by the combining means in the order based on the rotational angle, and address generating means for generating a write address so that the word data output from the output control means is stored in the page memory in the state in which the input image has been rotated by the predetermined rotational angle. However, $N \leq B \leq W$, $W \bmod B = 0$, $B \bmod N = 0$ in this case.

The image rotating apparatus according to the present invention controls write/read addresses every B/N pieces on bringing together input image data having N-bit information per pixel in accordance with word width B of the buffer memory, so that one kind of buffer memory can process the rotation of the input images different in the number of information bits without requiring several kinds of buffer memories respectively corresponding to the number of information bits when the process of rotating the input image data different in the number of information bits is performed. Moreover, any high-speed memory device can be dispensed with because access to data in the buffer memory need not be effected in a video clock cycle by setting B/N at 2 or greater. Therefore, the image rotating apparatus is advantageous in that it can afford a compact circuit arrangement, a decrease in circuitry heat generation and improvement in rotation processing speed. Moreover, the process of rotating images is possible without changing the construction of the buffer memory by switching the combination of buffer address control and the word output from the page memory in proportion to the number of information bits per pixel.

BRIEF DESCRIPTION OF THE DRAWINGS

FIG. 9 shows a diagram illustrating the image data read from the buffer memory to be arranged in one word of the page memory by way of example;

FIG. 10 shows a diagram illustrating the relation between an address of a page memory and an arrangement of a rotated image at rotational angles of 0° and 180°;

FIG. 20 shows a diagram illustrating the order in which write addresses are generated by the buffer memory-write address generating circuit according to the present invention;

FIG. 21 shows a diagram illustrating the order in which read addresses are generated by the buffer memory-read address generating circuit when the rotational angles are 0° and 180°;

FIG. 22 shows a diagram illustrating the order in which read addresses are generated by the buffer memory-write address generating circuit for the buffer memory #A when the counterclockwise rotational angles are 90° and 270°;

FIG. 23 shows a diagram illustrating the order in which read addresses are generated by the buffer memory-write address generating circuit for the buffer memory #B when the rotational angles are 90° and 270°;

FIG. 27 shows a first part of a diagram illustrating the operation of the first word synthesizing circuit;

FIG. 28 shows a second part of a diagram illustrating the operation of the first word synthesizing circuit;

DETAILED DESCRIPTION OF THE PREFERRED EMBODIMENTS

A description of an image rotating apparatus according to an embodiment of the present invention will be made with reference to the accompanying FIGS. 1 through 10.

Figure 1:
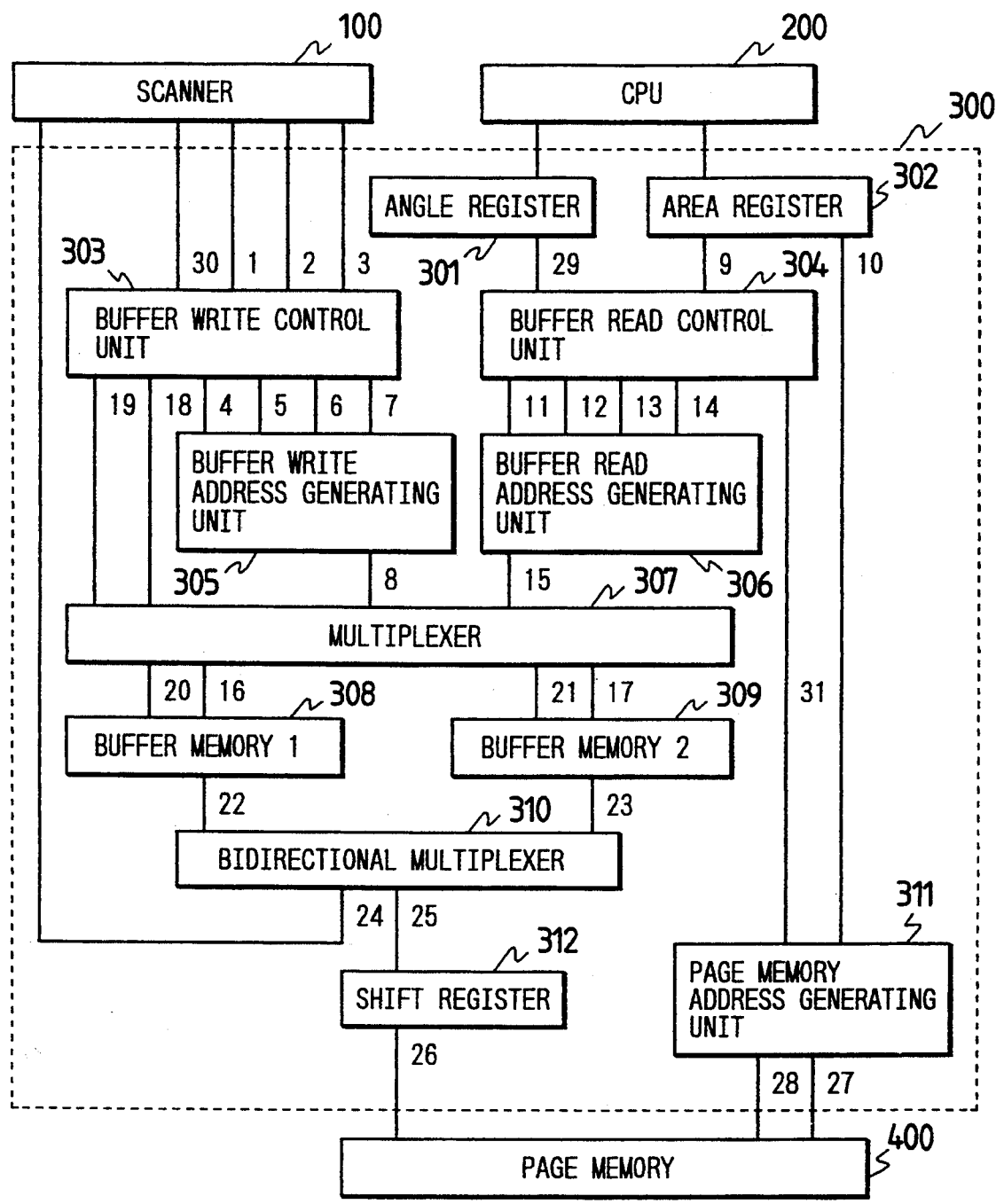
FIG. 1 shows a block diagram of an apparatus according to an embodiment of the present invention.

FIG. 1 is a block diagram of an image rotating apparatus according to an embodiment of the present invention. In FIG. 1, numeral 100 denotes a scanner, 200 a central processing unit, 300 an image rotating apparatus, and 400 a page memory.

As shown in FIG. 1, the scanner 100 reads an original, converts the original into image data 3 having one bit per pixel, and sequentially feeds image data 3, together with an image clock signal 30, a page synchronizing signal 1 and a line synchronizing signal 2, to the image rotating apparatus 300. CPU 200 sets an area size of an image to be rotated and a rotational angle in the image rotating apparatus 300. The image rotating apparatus 300, based on the area size and the rotational angle that have been set, rotates the image data and feeds the resulting image data to a page memory 400. The page memory 400 has eight bits per wore and data 26 is written thereto in such a rotated state.

The image rotating apparatus 300 has an area register 302 and an angle register 301 in which not only the area size but also the rotational angle of an image to be rotated are set by CPU 200. The image rotating apparatus 300 also has buffer memories 308, 309 for rotating image data.

The buffer memories 308, 309 are 64K × 1 bit memories for alternately storing image data sequentially fed every eight lines under the control of a buffer write control unit 303, a buffer write address generating unit 305, a buffer read control unit 304, a buffer read address generating unit 306, a multiplexer 307 and a bidirectional multiplexer 310. The buffer memories also read data, word by word.

The buffer write control unit 303 switches the buffer memories. The buffer write address generating unit 305 writes image data to the buffer memory 308 or 309 and also causes a write address to be generated.

Figure 2:
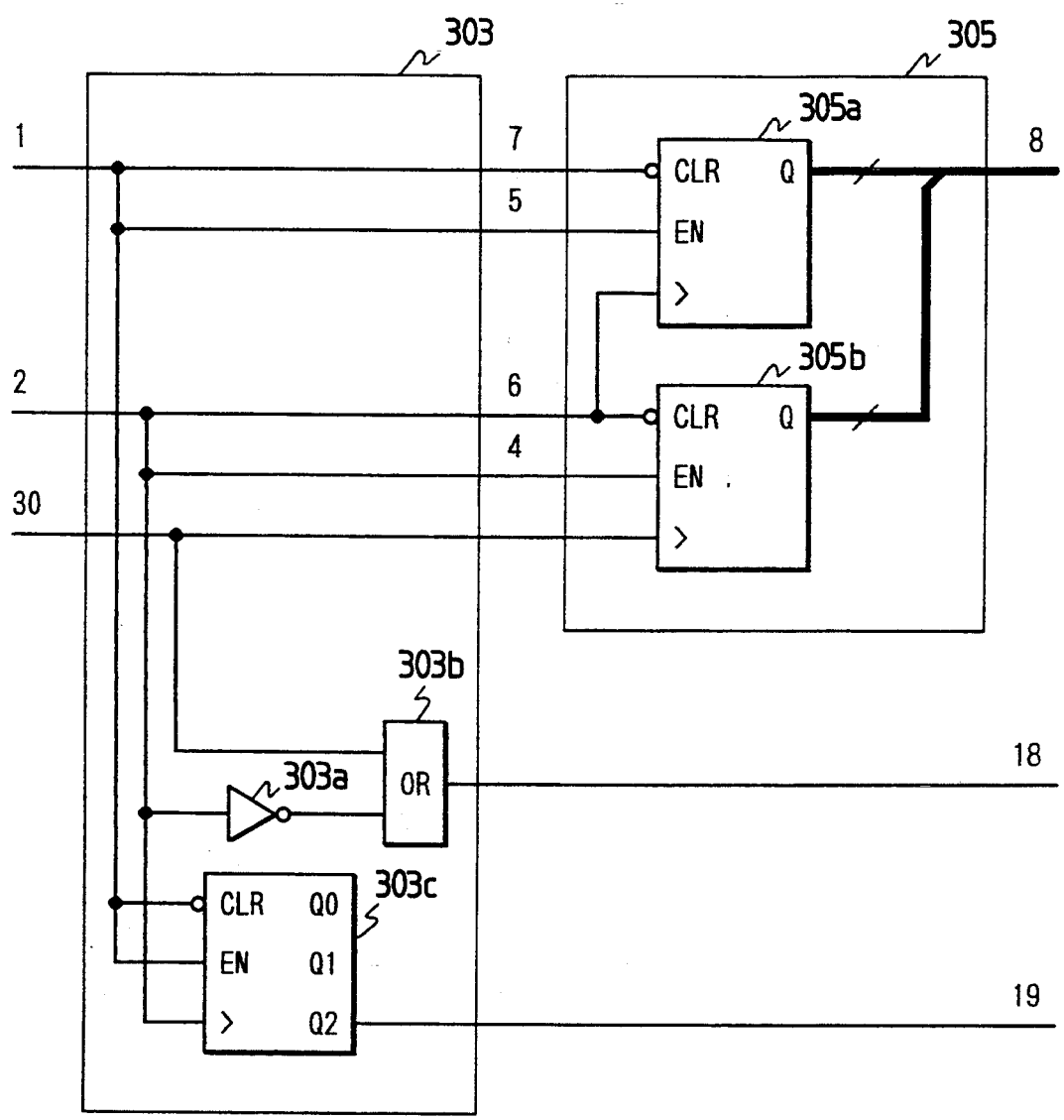
FIG. 2 shows a block diagram illustrating buffer memory write control.

More specifically as shown in FIG. 2, the buffer write control unit 303 is cleared by a page synchronizing signal 1 and thus becomes count-enable, causing a 3-bit counter 303c for counting line synchronizing signals 2 to output a buffer switching signal 19 every eight lines, and causing an OR circuit 303b to output an active low buffer write signal 18 in synchronization with an image clock signal. In this case, the line synchronizing signal 2 is applied via an invertor 303a to one input of OR circuit 303b and an image clock signal 30 to the other input thereof.

The buffer write address generating unit 305 has a 3-bit counter 305a and a 13-bit counter 305b. The 3-bit counter 305a is cleared by a write Y count clear signal 7, and a write Y count enable signal 5 which are generated by the page synchronizing signal 1 in the buffer write control unit 303, thus becomes count-enable and then outputs a Y-direction address by counting the line synchronizing signals 2. The 13-bit counter 305b is cleared by a write X count clear signal 6, and a write X count enable signal 4 which are generated by the line synchronizing signal 2 in the buffer write control unit 303, thus becomes count-enable and then outputs an X-direction address by counting the image clock signals 30. A buffer write address 8 is thereby output by each of the counters.

The multiplexer 307 switches a target for an address from the buffer write address generating unit 305 to be written to the buffer memory 308 or 309 in response to the buffer switching signal 19 from the buffer write control unit 303. The multiplexer 307 applies a write signal 20, an address 16 or a write signal 21, and an address 17 to a buffer memory address at which eight lines of image data have been written completely.

The bidirectional multiplexer 310 is controlled by the buffer write control unit 303 in such a way that the input/output of the image data alternate therebetween (between an input to the buffer memory 308 and an output from the buffer memory 309) or (an output from the buffer memory 308 and an input to the buffer memory 309) every eight lines.

In this way, the buffer write address generating unit 335, the multiplexer 307 and the bidirectional multiplexer 310 are controlled by the buffer write control unit 303. The image data 24 from the scanner 100 is written to the buffer memories 308, 309 alternately via the bidirectional multiplexer 310 every eight lines.

The buffer read control unit 304 controls the buffer read address generating unit 306 in such a way that a read address 15 corresponding to the rotational angle is generated from the buffer memory to which eight lines of image data have completely been written first and reads image data.

Figure 3:
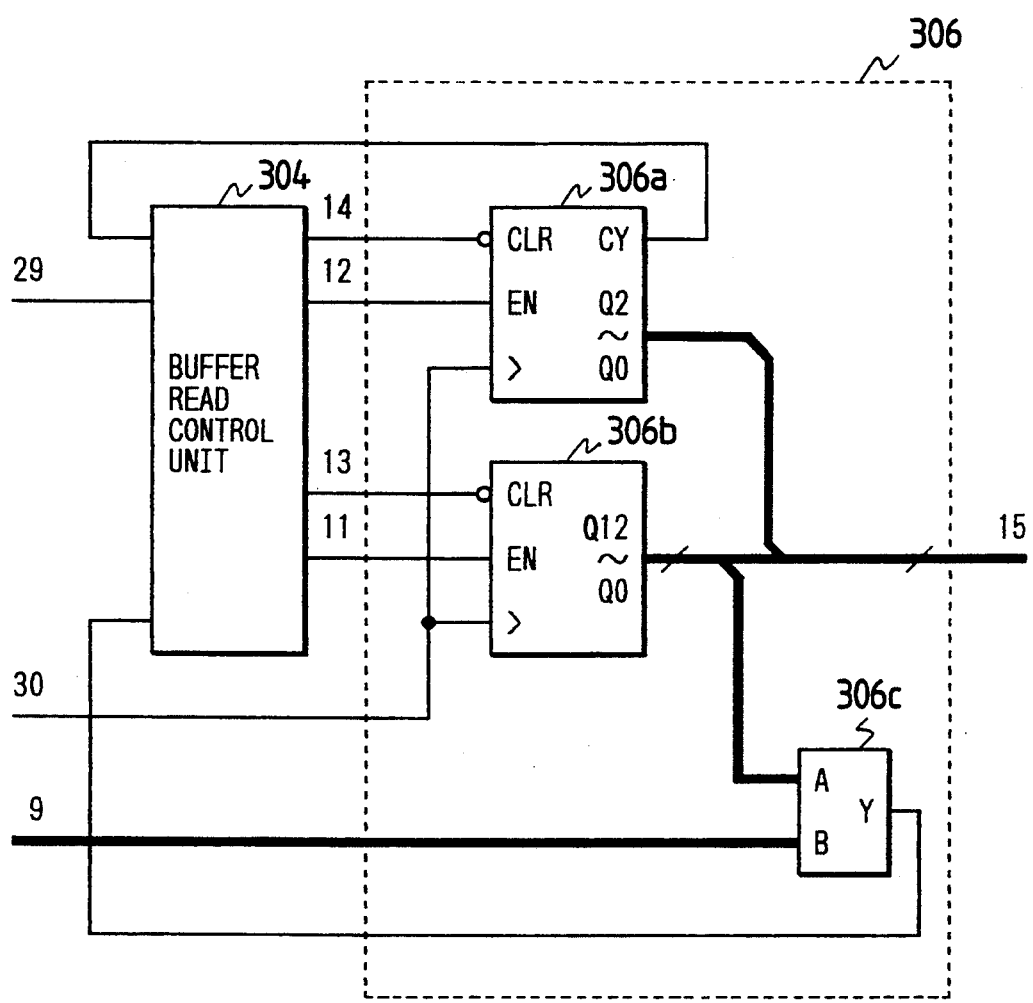
FIG. 3 shows a block diagram illustrating buffer memory read control.

In other words, the buffer read address generating unit 306 has, as shown in FIG. 3, a 3-bit counter 306a for generating Y-direction addresses, a 13-bit counter 306b for generating X-direction addresses and a 13-bit comparator 306c for making a comparison with X-direction area size. The 3-bit counter 306a is cleared by a read Y count clear signal 14 and a read Y count enable signal 12 from the buffer read control unit 304 and thus becomes count-enable. The 3-bit counter 306a is also cleared after it generates a Y-direction address by counting the image clock signals 30 and feeds back the signal to the buffer read control unit 304 when the data equivalent to eight lines are accomplished. Further, the 13-bit counter 306b is cleared by a read X count clear signal 13 and a read X count enable signal 11 from the buffer read control unit 304 and thus becomes count-enable. The 13-bit counter 306b is simultaneously cleared after it causes the 13-bit comparator 306c to compare the X-direction thus generated with X-direction area size and feeds back the signal to buffer read control unit 304 when the X-direction area size is reached.

The image data 25 read by the buffer read address 15 thus generated is fed via the bidirectional multiplexer 310 to a shift register 312 and its bits are subjected to serial/parallel conversion sequentially every eight bits starting with the most significant bit to form one word data of the page memory.

A page memory address generating unit 311 is controlled by the buffer read control unit 304 and generates a write address 28 of the page memory 400 to which one word data is to be written on the basis of area size data 10 from the area register 302 and simultaneously applies an access signal 27 to the page memory.

Figure 4:
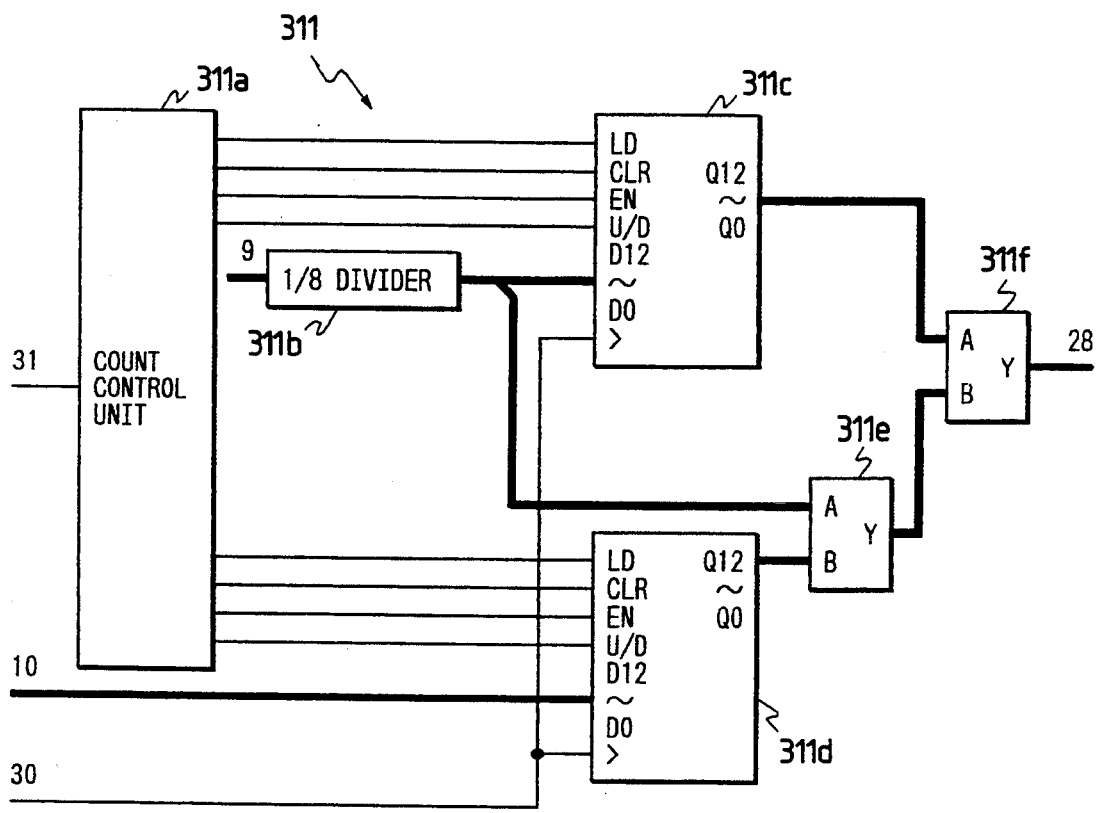
FIG. 4 shows a block diagram illustrating a buffer memory address generating unit.

More specifically as shown in FIG. 4, the page memory address generating unit 311 comprises a counter control unit 311a, a ⅛ divider 311b, 13-bit up/down counters 311c, 311d, a multiplier 311e and an adder 311f. The counter control unit 311a controls the counters 311c, 311d by means of a page memory address count control signal 31 from the buffer read control unit 304 with respect to its clear, load, enable and up/down operations. The counter 311c counts up or down the image clock signal 30 according to a 150 value of the X-direction data size obtained from the divider 311b, the output of the divider being simultaneously set as one input of the multiplier 311e. Moreover, the counter 311d counts up or down the image clock signal 30 in accordance with the Y-direction data size, multiplies the resulting output as the other input of the multiplier 311e and adds what results from the multiplication to the output of the counter 311c by means of the adder 311f, whereby the page memory address 28 corresponding to the rotational angle is generated, as will be described later.

Figures 5, 6:
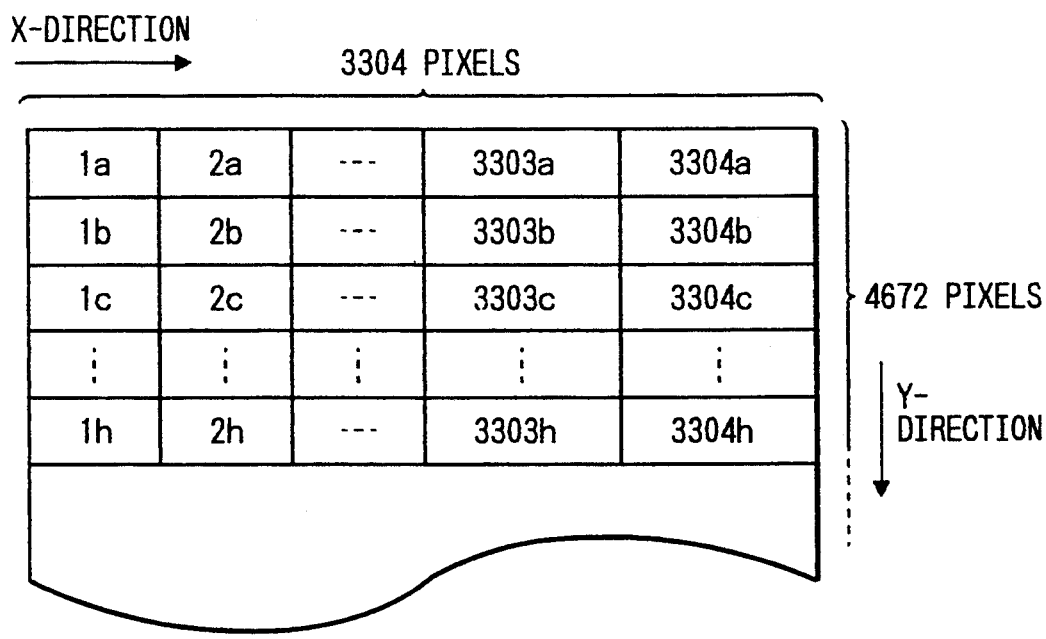
FIG. 5 shows a diagram showing original image data.
FIG. 6 shows a diagram illustrating the relation between an address of a page memory and an arrangement of a rotated image at rotational angles of 90°, 270°.

A description will subsequently be given of a case where an image having 3,304 pixels in the direction of X and 4,672 pixels in the direction of Y is rotated by 90° (a rotational angle of 270°) counterclockwise as shown in FIG. 5, whereas data having 4,672 pixels in the direction of X and 3,304 pixels in the direction of Y is stored as shown in FIG. 6 in such an arrangement that data at the upper left-hand corner of the image thus rotated is stored at an address of 0H (in hexadecimal) of a page memory as the most significant bit and data at the lower right-hand corner of the image thus rotated is stored at an address of 1D713FH (in hexadecimal) thereof as the least significant bit. Incidentally, characters such as 1a, 2a in the frames of FIG. 5 represent image data of one bit, whereas hexadecimal numerals in the frames denote addresses in the page memory.

First, CPU 200 of FIG. 1 causes the number of pixels CE8H (in hexadecimal) in the direction of X and the number of pixels 1240H (in hexadecimal) in the direction of Y to be written to the area register 302 and also causes a code indicating a rotational angle of 90° counterclockwise to be written to the angle register 301. The image data read by the scanner 100 are fed in the order of 1a→2a → . . . →3303a→3304a→1b→2b→ . . . →3304b→1c→. . . .

The buffer write control unit 303 of FIG. 1 controls the buffer write address generating unit 305, the multiplexer 307 and the bidirectional multiplexer 310 so that 1 to 8 lines of the image data that have been fed are written to the buffer memory 308. In this case, addresses in the buffer memories 308, 309 respectively have 16 bits, and low order 13 bits are allocated to an address AX in the direction of X and high order 3 bits to an address AY in the direction of Y. When the first pixel on the first line is written, AY=0H, AX=0H are output from the 3-bit counters 305a and the 13-bit counter 305b of the buffer write address generating unit (see FIG. 2). When the second pixel is written, AY=0H, AX=1H (the rest is omitted) are output and written. When the 3,304th pixel is written, AY=0H, AX=CE7H are output and written. For the first pixel on the second line, AY is incremented and AX is cleared and AY=1H, AX=0H are output. For the second pixel, AY=1H, AX=1H are output and written. Image data up to 8th line are also written to the buffer memory 308 in the arrangement shown in FIG. 8.

Figures 7, 8:
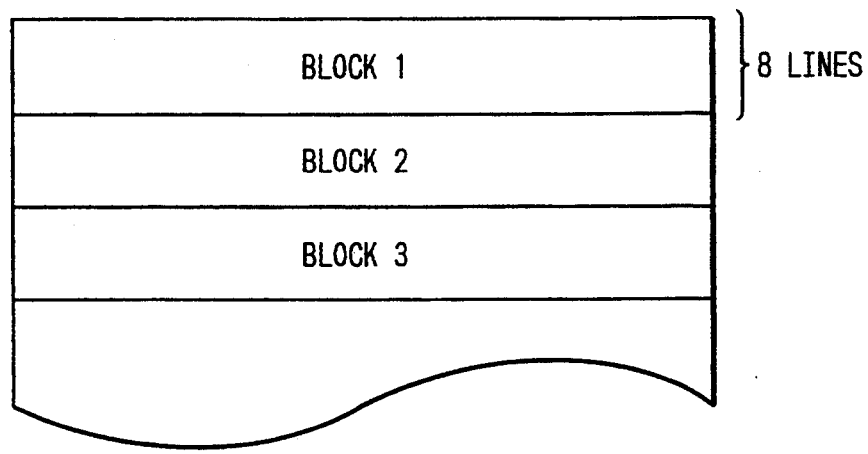
FIG. 7 shows a diagram resulting from dividing an original image into blocks.
FIG. 8 shows a diagram illustrating the address of the buffer memory and data.

Image data from the 9th to 16th line are written to the buffer memory 309 in the same arrangement likewise. When the original image is divided into blocks of every eight lines as shown in FIG. 7, block 1 is written to buffer memory 308, block 2 to buffer memory 309 and the block 3 to buffer memory 308, that is, the blocks are alternately written in this manner. In this case, the operation of writing the blocks to the buffer memories is independent of the rotational angle and invariable at all times.

When block 1 is written to the buffer memory 308, the switching signal 19 from the 3-bit counter 303c (see FIG. 2) of the buffer write control unit 303 causes the multiplexer 307 and the bidirectional multiplexer 310 of FIG. 1 to be switched. At the same time, the buffer read control unit 304 and the buffer read address generating unit 306 operate and the buffer read address 15 of (AY=0H, AX=0H)→(AY=1H, AX=0H)→. . . →(AY=6H, AX=0H)→(AY=7H, AX=0H) is output from the 3-bit counter 306a and the 13-bit counter 306b (see FIG. 3) and further addresses are read from the buffer memory 308 in the order of (AY=0H, AX=0H)-→(AY=1H, AX=0H)→. . . →(AY=6H, AX=0H)-→(AY=7H, AX=OH). In other words, data equivalent to eight pixels are read in the order of 1a→1b→. . . →1g→1h and subjected to serial/parallel conversion in the shift register 312 so that 1a and 1h are respectively arranged as the most significant bit and the least significant bit and then disposed as 8-bit data (word 1) to the page memory 400 as shown in FIG. 9. Data of 2a→2b→. . . →2g→2h (word 2), (omitted) 3303a→3303b→. . . →3303g→3303h (word 3303), 3304a→3304b→. . . →3304g→3304h (word 3304) are sequentially read and subjected to serial/parallel conversion likewise.

In order to arrange the 8-bit data thus read out by rotating 90° counterclockwise, it is only needed for addresses to be written to the page memory shown in FIG. 6 in the order of 1D6EF8H→1D6CB0H→omitted→490H→248H→0H, 1D6EF9H→1D6CB1H→. . . →491H→249H→1H, (omitted), 1D713FH→1D6EF7H→. . . →6D7H→48FH→247H. Therefore, 1D6EF8H is supplied to the word 1 from 1a up to 1h of FIG. 9 as a target write address in the page memory address generating unit of FIG. 1 and written to the page memory. To the word 2 from 2a up to 2h, the page memory address 1D6CB0H is supplied and written likewise. In this way, the page memory addresses decremented by 248H are output and one word data are sequentially written. In other words, given the block number B in FIG. 7 and the word number W in FIG. 9, the page memory address P to which this word is written is calculated with respect to the area sizes X, Y by $$\begin{aligned} P &= (X - 1) \times Y/8 + B - 1 - 248H \times (W - 1) \\ &= 248H \times (3304 - 1) + B - 1 - 248H \times (W - 1) \\ &= 1D713FH + B - 248H \times W \end{aligned}$$

(however, the number with H at the end means a hexadecimal number, whereas what is without H means a decimal one)

When the data in the block 1 of FIG. 7 is thus read from the buffer memory 308, the buffer memories 308 and 309 are switched and the data in the block 2 is read, word by word from the buffer memory 309 in the same address order as in the buffer memory 308. This operation is repeated until all the data are completely written to the page memory and terminated then.

When image data is rotated by 90° clockwise, the data is read from the buffer memory in the entirely same way as in the case of what has been rotated by 90° counterclockwise. In order to arrange the 8-bit data by rotating them by 90° clockwise, addresses should be written to the page memory of FIG. 6 in the order of 247H→48FH→6D7H . . . →1D713FH→. . . 0H→248FH→490H→. . . 1D6EF8H. Therefore, 247H is supplied to the word 1 from 1a up to 1h as a target write address in the page memory address generating unit of FIG. 1 and written to the page memory. To the word 2 from 2a up to 2h, the page memory address 48FH is supplied and written likewise. In this way, one word data are sequentially written. Given the block number B in FIG. 7 and the word number W in FIG. 9 at this time, the page memory address P to which this word is written is calculated with respect to the area sizes X, Y by $$P = Y/8 - 1 - (B - 1) + 248H \times (W - 1)$$
$$= 248H - B + 248H \times (W - 1)$$

When image data is rotated by 180° counterclockwise, 19CH word in the direction of X and page memory address of 4672 in the direction of Y are allocated as shown in FIG. 10 and 3304 pixel in the direction of X and 4672 pixel in the direction of Y are rotated by 180° and arranged.

The writing of data to the buffer memory is made by writing the first line up to the 8th line to the buffer memory 308 as in the case of rotation by 90° (clockwise, counterclockwise). When the data are read from the buffer memory 308 then, the buffer memory addresses are sequentially read in terms of eight pixels (word 1) in the order of (AY=0H, AX=7H)→(AY=0H, AX=6H)→omitted→(AY=0H, AX=1H)-→(AY=7H, AX=0H) and arranged from the most significant bit before being written to 1D713FH as the last address of one page in the page memory shown in FIG. 10. Then, eight pixels (word 2) (AY=0H, AX=FH)→(AY=0H, AX=EH)→omitted→ (AY=0H, AX=9H)→(AY=0H, AX=8H) in the buffer memory are written to a page memory address 1D713EH. Each word is subsequently read in the direction of X of the buffer memory and the operation of decrementing the page memory address by one is carried on.

The page memory address P corresponding to the Kth word at this time is calculated with respect to area sizes X, Y by $$P = X \times Y/8 - 1 - (K - 1)$$
$$= 1D713FH - (K - 1)$$

In the case of a rotational angle of 0°, the buffer memory addresses are read, word by word, every eight pixels in the direction of X of the buffer memory in the order of (AY= 0H, AX=0H)→(AY=0H, AX=1H-)→omitted→(AY=0H, AX=7H), (AY=0H, AX=8H)→(AY=0H, AX=9H)→omitted→ (AY=0H, AX=FH) . . . →(AY=7H, AX=0H)- →(AY=7H, AX=1H)→omitted→(AY=7H, AX=7H), (the rest is omitted). While each address is incremented by one, the data in the buffer memory should then be written to the page memory addresses in the order of 0H, 1H, 2H . . .

Although bit width per pixel of the image data has been set to 1 and bit width per word of the page memory to 8 in the embodiment shown, given bit width n per pixel of the image data and bit width m per word of the page memory, the data width in the subscanning direction on an m/n line has m bits, thus satisfying the bit width m per word. Therefore, data can be processed likewise if they are alternately written to the buffer memory every m/n lines. In the case of rotational angles of 0°, 180°, eight lines or m/n lines may be processed without readout.

A description of an image rotating apparatus according to another embodiment of the present invention will be made with reference to the accompanying FIGS. 11 through 30.

The image rotating apparatus in this embodiment makes it possible to rotate an input image whose number of information bits N per pixel is one or two and it is assumed that a buffer memory has a word width B of 4 bits and a page memory has a word width W of 8 bits.

Figure 11:
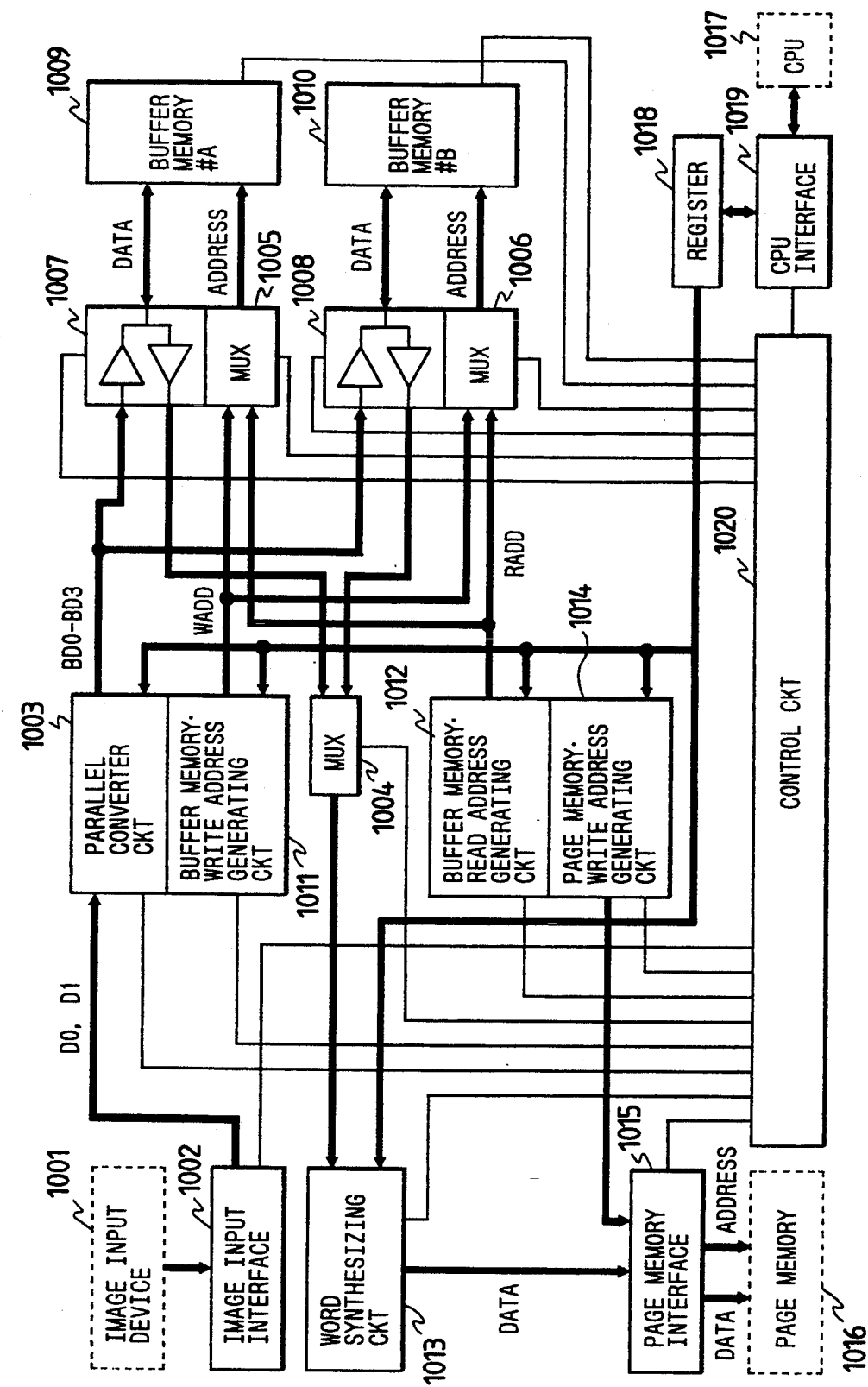
FIG. 11 shows a block diagram of an image rotating apparatus according to another embodiment of the present invention.

FIG. 11 is a block diagram illustrating an embodiment of the present invention. Reference numeral 1001 denotes an image input unit for inputting images to the image rotating apparatus according to the present invention and for raster-outputting image data synchronized with a video clock signal together with control signals such as line and page synchronizing signals. An image input interface 1002 is what fetches image data from the image input unit 1001 to the image rotating apparatus and it fetches only effective image data out of the image data that have been raster-output from the image input unit 1001 in synchronization with the video clock signal by utilizing the control signals such as the page and line sychronizing signals. Reference numeral 1003 denotes a parallel converter circuit for forming B-bit parallel data by lining up image data having N bits per pixel every (B/N) pixels in synchronization with the video clock signal. Reference numerals 1004, 1005 and 1006 denote multiplexers for selectively outputting either of two data thus supplied by means of the control signal. Reference numerals 1007 and 1008 denote bidirectional buffers for feeding the image data output from the parallel converter circuit 1003 to respective buffer memories 1009, 1010 and feeding the image data respectively read from the buffer memories 1009, 1010 to the multiplexer 1004. Reference numerals 1009 and 1010 denote buffer memories #A, #B for temporarily respectively storing the images supplied, such as SRAM. Numeral 1011 denotes a buffer memory-write address generating circuit for generating an address for use when image data is written to the buffer memory #A9 or #B10. Reference numeral 1012 denotes a buffer memory-read address generating circuit for generating an address when image data is read from the buffer memory #A9 or #B10, and 1013 denotes a word synthesizing circuit for combining the image data read from the buffer memory #A9 or #B10 in a predetermined order into a word having W bits so that a rotated image may be generated. Reference numeral 1014 denotes a page memory write address generating circuit for generating a write address of the synthetic image data in the word synchronization circuit 1013, so that an input image is supplied to a page memory in a rotated state as desired. Reference numeral 1015 denotes a page memory interface for writing the image data to the page memory by handshaking with the page memory so as to output the image data and the address, and 1016 denotes a page memory for storing the input image subjected to the rotational process by the image rotating apparatus. Reference numeral 1017 denotes a CPU (Central Processing Unit) for setting a rotational angle, input image size, the number of information bits per pixel of the input image and the like in the image rotating apparatus, and for starting the rotating process. Reference numeral 1018 denotes a register for storing and holding the rotational angle, the input image size, the number of information bits per pixel and the like set by CPU 1017, 1019 denotes a CPU interface for establishing the interface between CPU 1017 and the image rotating apparatus, and 1020 denotes a control circuit for controlling the whole image rotating apparatus while monitoring and controlling the condition of each block.

A description will subsequently be given in line with the process steps in due order. The image fetched from the input image unit 1001 to the input image interface 1002 is fed to the parallel converter circuit 1003.

Figure 12:
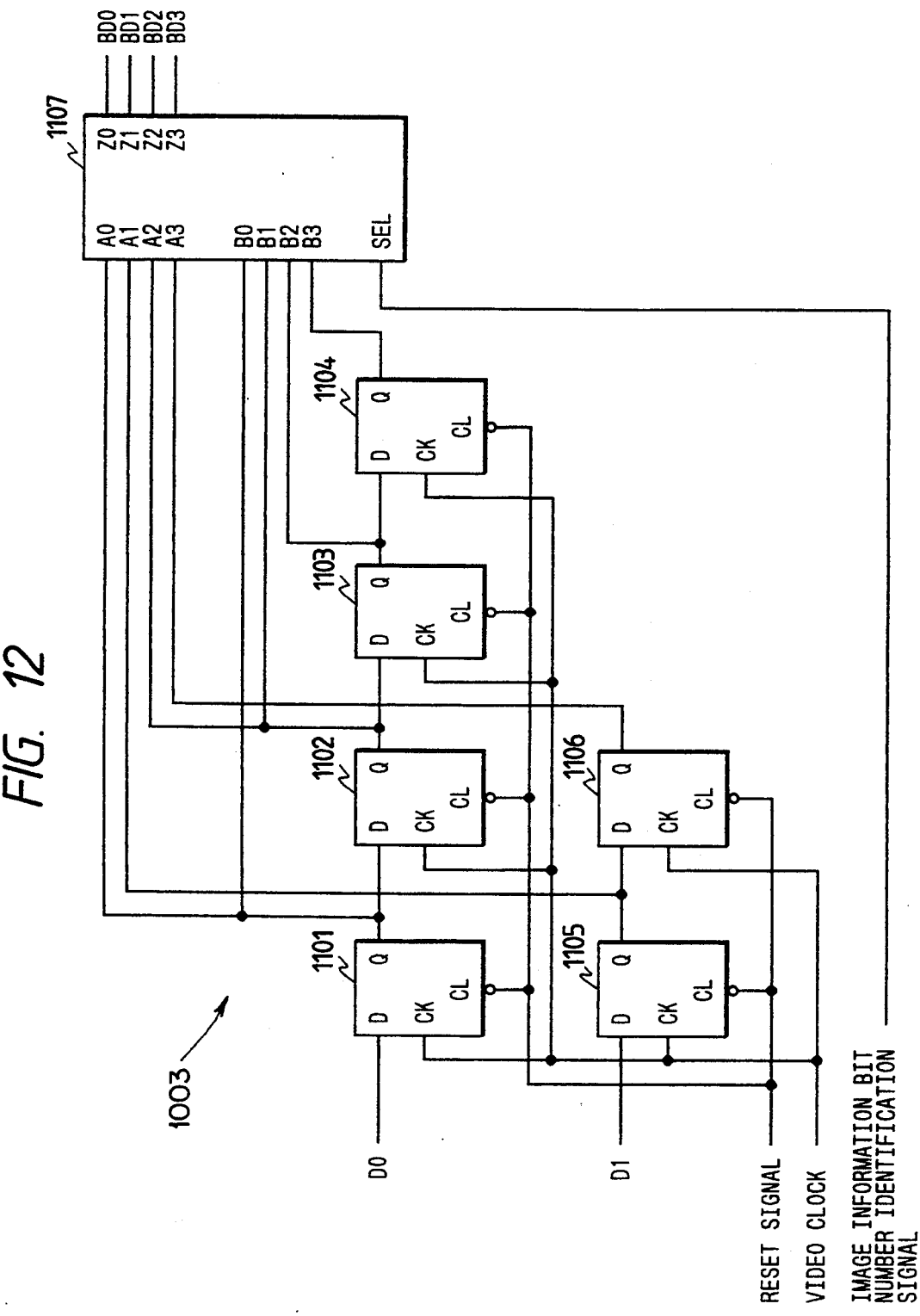
FIG. 12 shows a diagram of a parallel converter circuit embodying the present invention.

FIG. 12 is a diagram illustrating the parallel converter circuit 1003 comprising D flip-flops 1011~1106 and a multiplexer 1107 for selecting two 4-bit input data. As a reset signal is asserted prior to starting the rotational process, the D flip-flops 1101~1106 are initialized. Then, the image data fed together with a video clock signal is supplied to data lines D0, D1 in synchronization with the video clock signal when the number of information bits of the input image N=2 and to the data lines D1 in synchronization with the video clock signal when the number of information bits of the input image N=1. When the number of information bits N=2, the image data is converted to 4-bit data every two pixels in parallel and when the number of information bits N=1, it is converted to 4-bit data every four pixels in parallel.

The input image data subjected to parallel conversion in the parallel converter circuit 1003 is then written to the buffer memory #A9 to the extent of (W/N) lines thereof in accordance with the address generated by the buffer memory-write address generating circuit 1011. Subsequently, (W/N) lines of the input image data written to the buffer memory-write address generating circuit 1011 is written to the buffer memory #B10 in accordance with the address generated by the buffer memory-write address generating circuit 1011. The data previously written to the buffer memory #A9 is simultaneously read in accordance with the address generated by the buffer memory-read address generating circuit 1012. Thus, the buffer memories #A9, #B10 alternately write and read the input image every (W/N) lines thereof. In other words, the buffer memories #A9, #B10 are used in the form of a ping-pong buffer.

Figure 13:
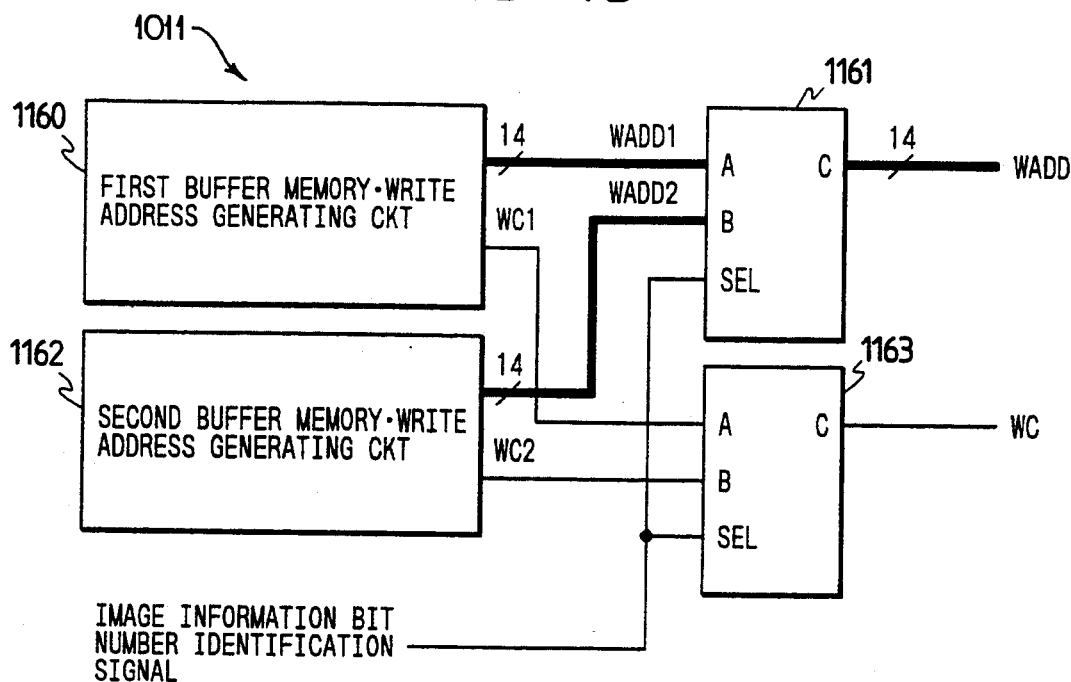
FIG. 13 shows a block diagram of a buffer memory-write address generating circuit embodying the present invention.

FIG. 13 illustrates the buffer memory-write address generating circuit 1011. Reference numeral 1160 denotes a first buffer memory-write address generating circuit corresponding to the input image of N=2 and 1162 denotes a second buffer memory-write address generating circuit corresponding to the input image of N=1. In this case, a multiplexer 1161 switches the data write address by means of an image information bit number identification signal. A multiplexer 1163 also switches a write completion signal WC by means of the image information bit number identification signal.

Figure 14:
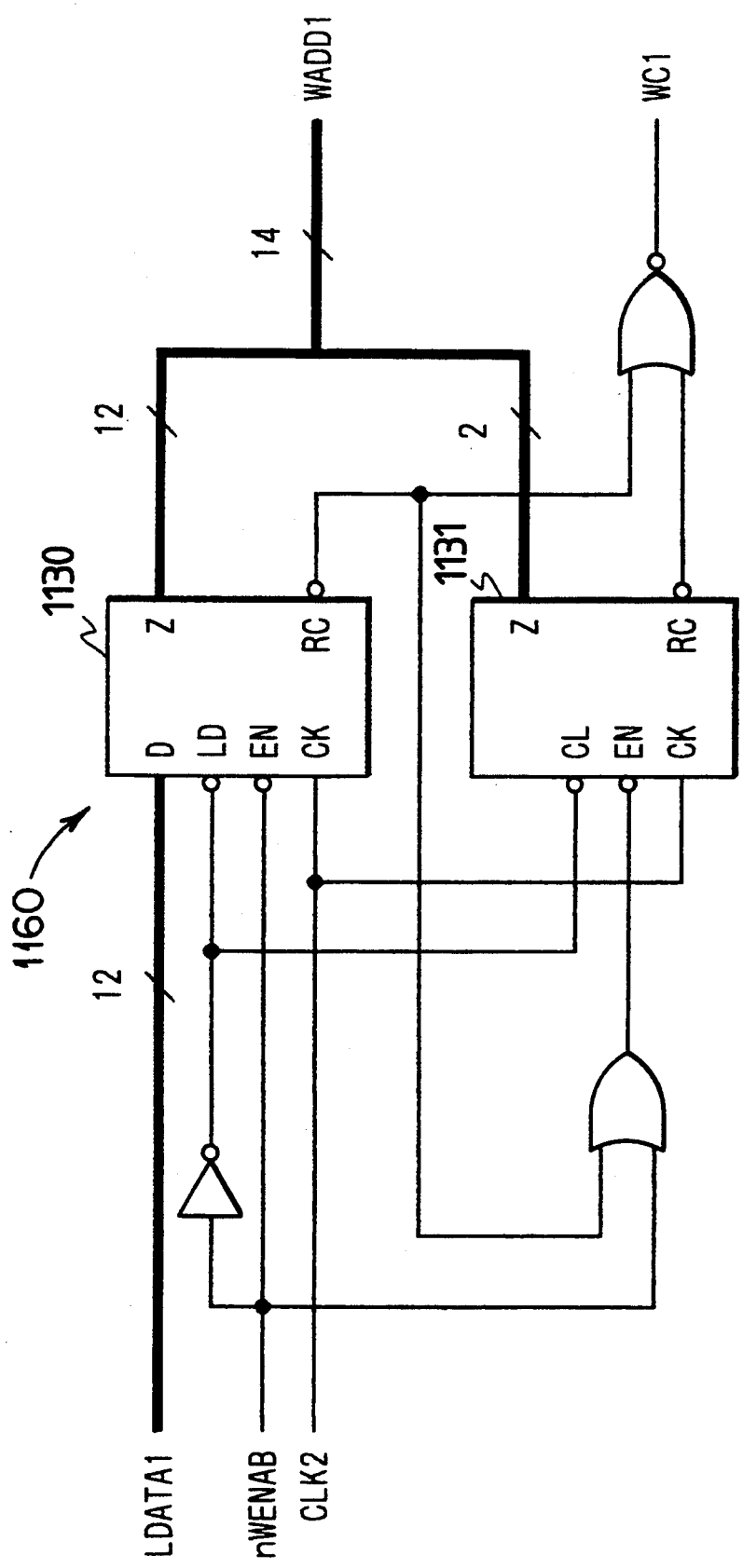
FIG. 14 shows a diagram of a first buffer memory-write address generating circuit embodying the present invention.

FIG. 14 is a detailed diagram of the first buffer memory-write address generating circuit 1160. With reference to the size of the input image to be set in the register 1018, CPU 1017 obtains (NF/B×N−1) from the number of pixels NF in the main scanning direction with respect to each N and sets (NF/2−1) as a signal LDATA 1 and (NF/4−1) as a signal LDATA 2. Moreover, the signal LDATA 1 is applied to a 12-bit loadable counter 1130. CLK 2 represents a clock signal equivalent to what results from dividing the video clock signal into two. Reference numeral 1131 denotes a 2-bit down counter. WADD 1 and WC 1 in FIG. 14 represent the write address generated by the first buffer memory-write address generating circuit 1160 and its write completion signal, respectively.

Figure 15:
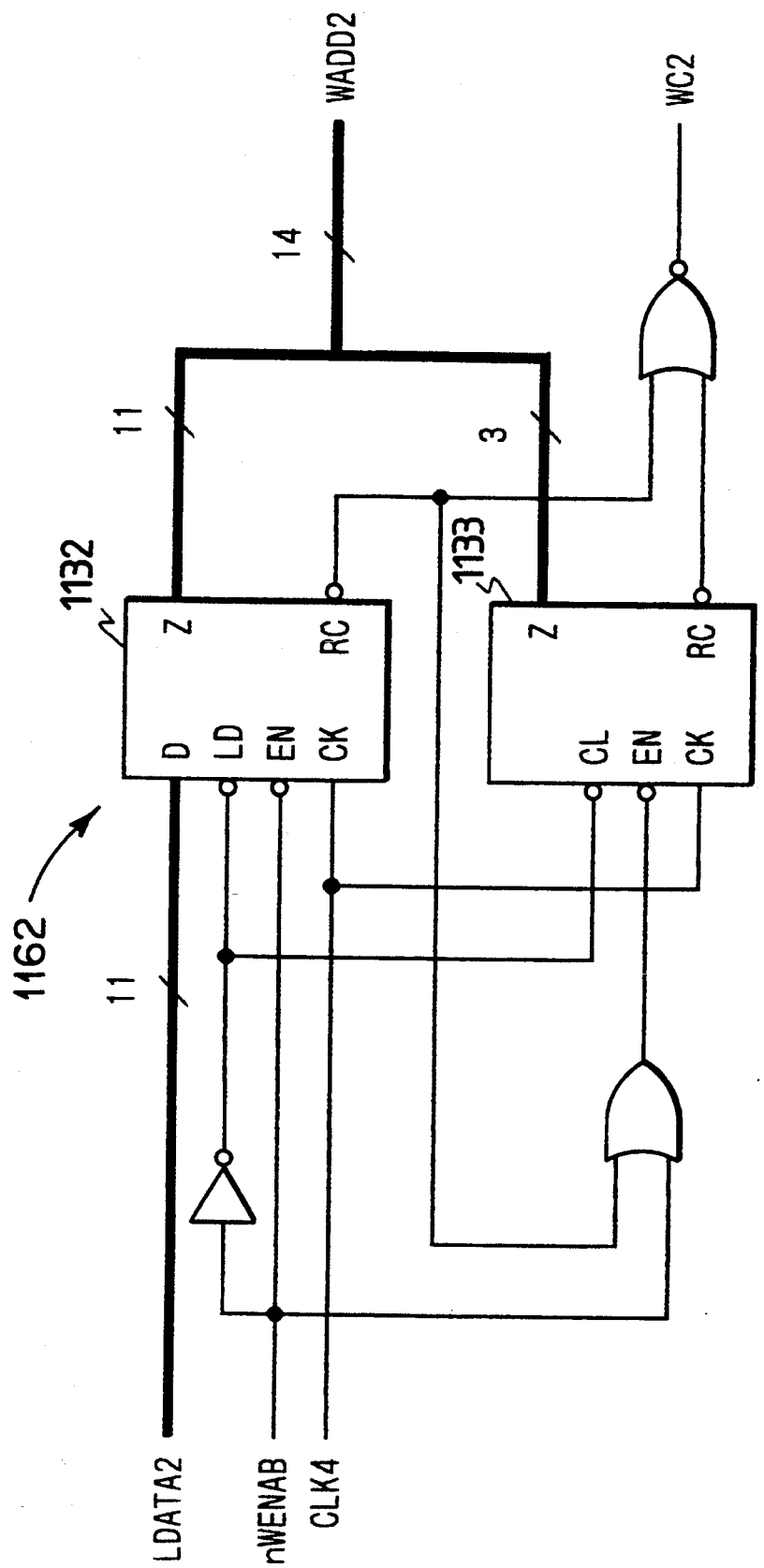
FIG. 15 shows a diagram of a second buffer memory-write address generating circuit embodying the present invention.

FIG. 15 is a detailed diagram of the second buffer memory-write address generating circuit 1162. The signal LDATA 2 is fed to an 11-bit loadable down counter 1132. CLK 4 represents a clock signal equivalent to what results from dividing the video clock signal into four. Reference numeral 1133 denotes a 3-bit down counter. WADD 2 and WC 2 in FIG. 15 represent the write address generated by the second buffer memory-write address generating circuit 1162 and its write completion signal, respectively.

Figure 16:
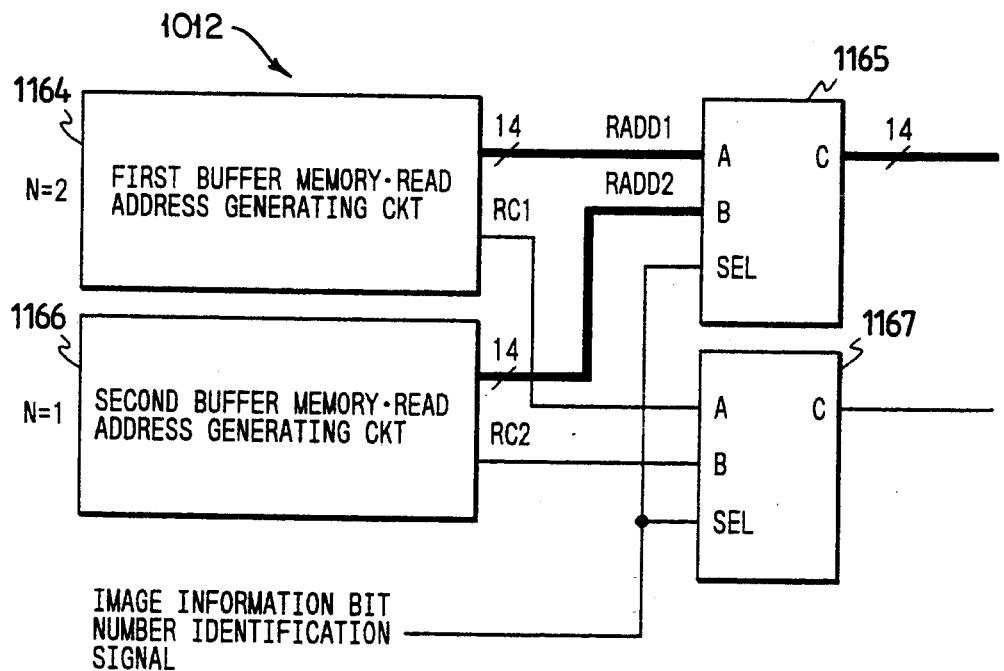
FIG. 16 shows a block diagram of a buffer memory-read address generating circuit embodying the present invention.

FIG. 16 illustrates the buffer memory-read address generating circuit 1012. Reference numeral 1164 denotes a first buffer memory-read address generating circuit for generating a read address in the buffer memory corresponding to the input image of N=2 and 1166 a second buffer memory-read address generating circuit for generating the read address of the buffer memory corresponding to the input image of N=1. In this case, a multiplexer 1165 switches the data read address by means of the image information bit number identification signal. A multiplexer 1167 also switches a read completion signal RC by means of the image information bit number identification signal.

The data read address of the buffer memory is controlled according to which one of the buffer memories #A9, #B10 is the rotational angle and read buffer.

Figure 17:
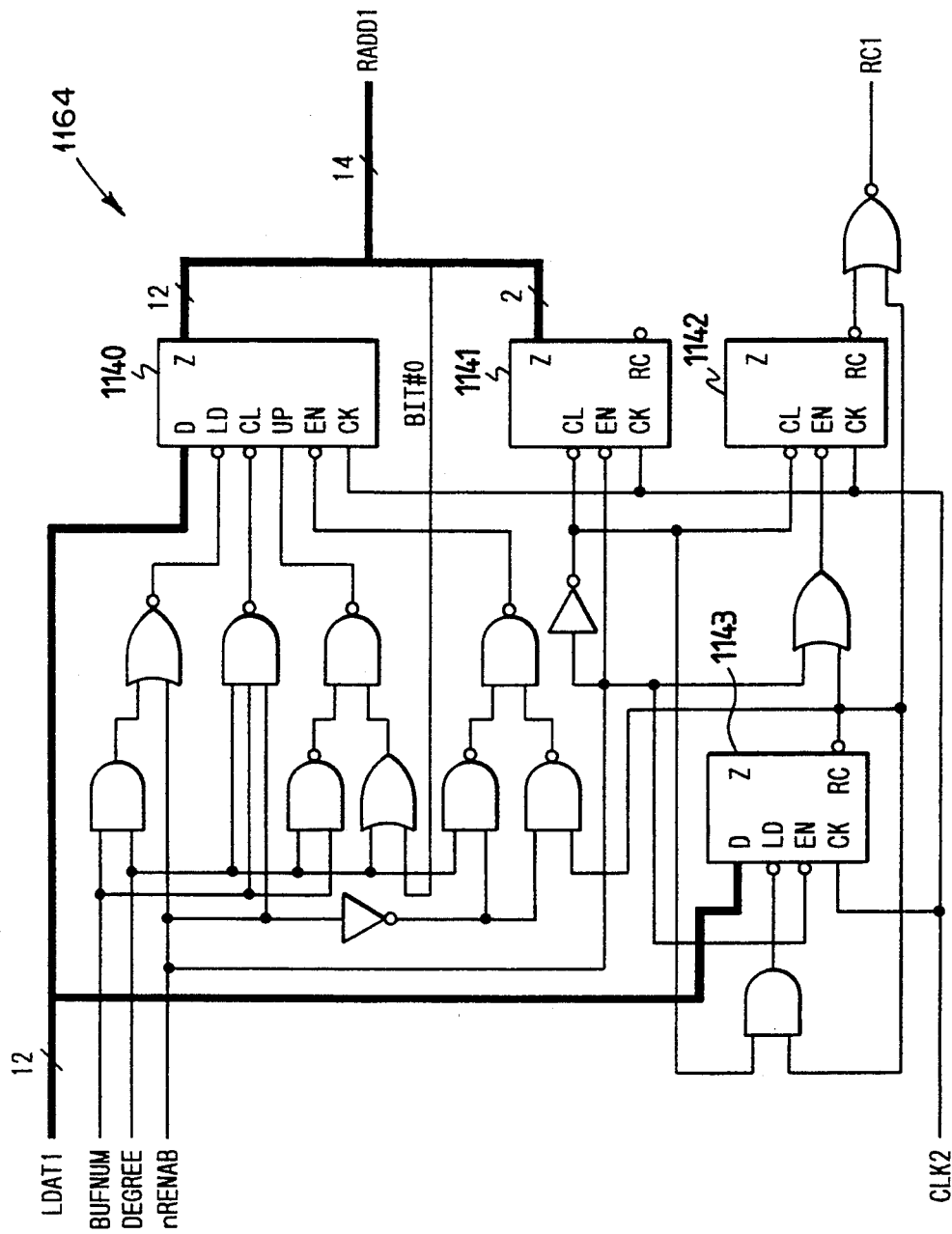
FIG. 17 shows a diagram of a first buffer memory-read address generating circuit embodying the present invention.

FIG. 17 illustrates the first buffer memory-read address generating circuit 1164. Reference numeral 1140 denotes a 12-bit loadable up/down counter, 1141 and 1142 denotes 2-bit down counters, and 1143 denotes a 12-bit down counter. In this case, the counters 1142, 1143 denotes count the number of image data that have been read out (the number of addresses generated) and the counters 1140, 1141 generate read addresses. There are, as input signals, a signal LDAT 1 indicating the value (NF/2−1) stored in the register 1018, a signal DEGREE indicating the rotational angle stored in the register 1018, this signal taking L when the rotational angles are 0° and 180° and H when they are 90° and 270°, a signal BUFNUM taking L when the read buffer memory is the buffer memory #A9 and H when it is the buffer memory #B10, a read enable signal nRENAB to be output from a control circuit 1020, and a clock signal CLK 2 equivalent to what results from dividing the video clock signal into two.

Figure 18:
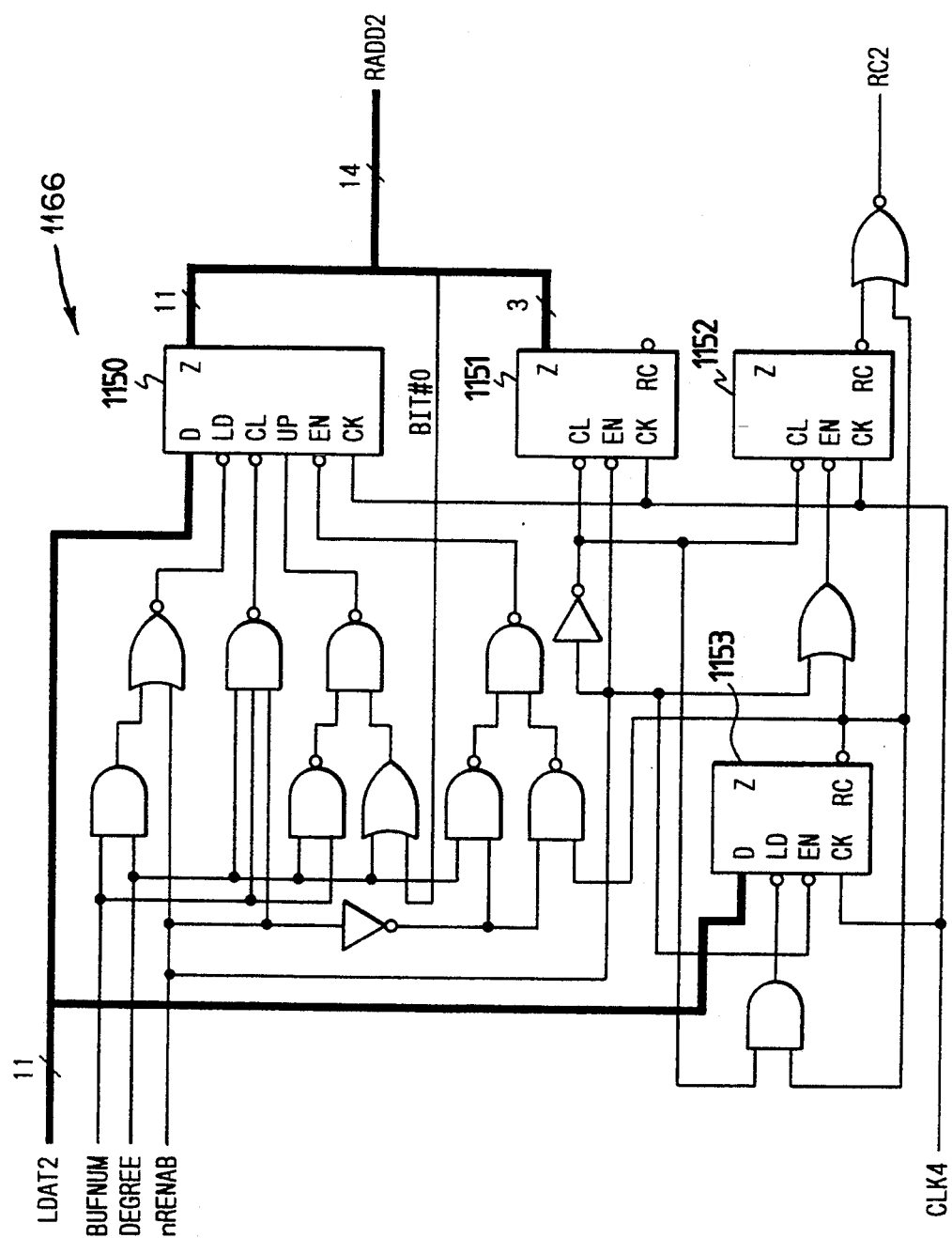
FIG. 18 shows a diagram of a second buffer memory-read address generating circuit embodying the present invention.

FIG. 18 illustrates the second buffer memory-read address generating circuit 1166. Reference numeral 1150 denotes an 11-bit loadable up/down counter, 1151 and 1152 denote 3-bit down counters, and 1153 denotes an 11-bit down counter. In this case, the counters 1152, 1153 count the number of image data that have been read out (the number of addresses generated) and the counters 1150, 1151 generate read addresses. There are, as input signals, a signal LDAT 2 indicating the value (NF/4−1) stored in the register 1018, a signal DEGREE indicating the rotational angle stored in the register 1018, this signal taking L when the rotational angles are 0° and 180° and H when they are 90° and 270°, a signal BUFNUM taking L when the read buffer memory is the buffer memory #A9 and H when it is the buffer memory #B10, a read enable signal nRENAB to be output from a control circuit 1020, and a clock signal CLK 4 equivalent to what results from dividing the video clock signal into four.

Figure 19:
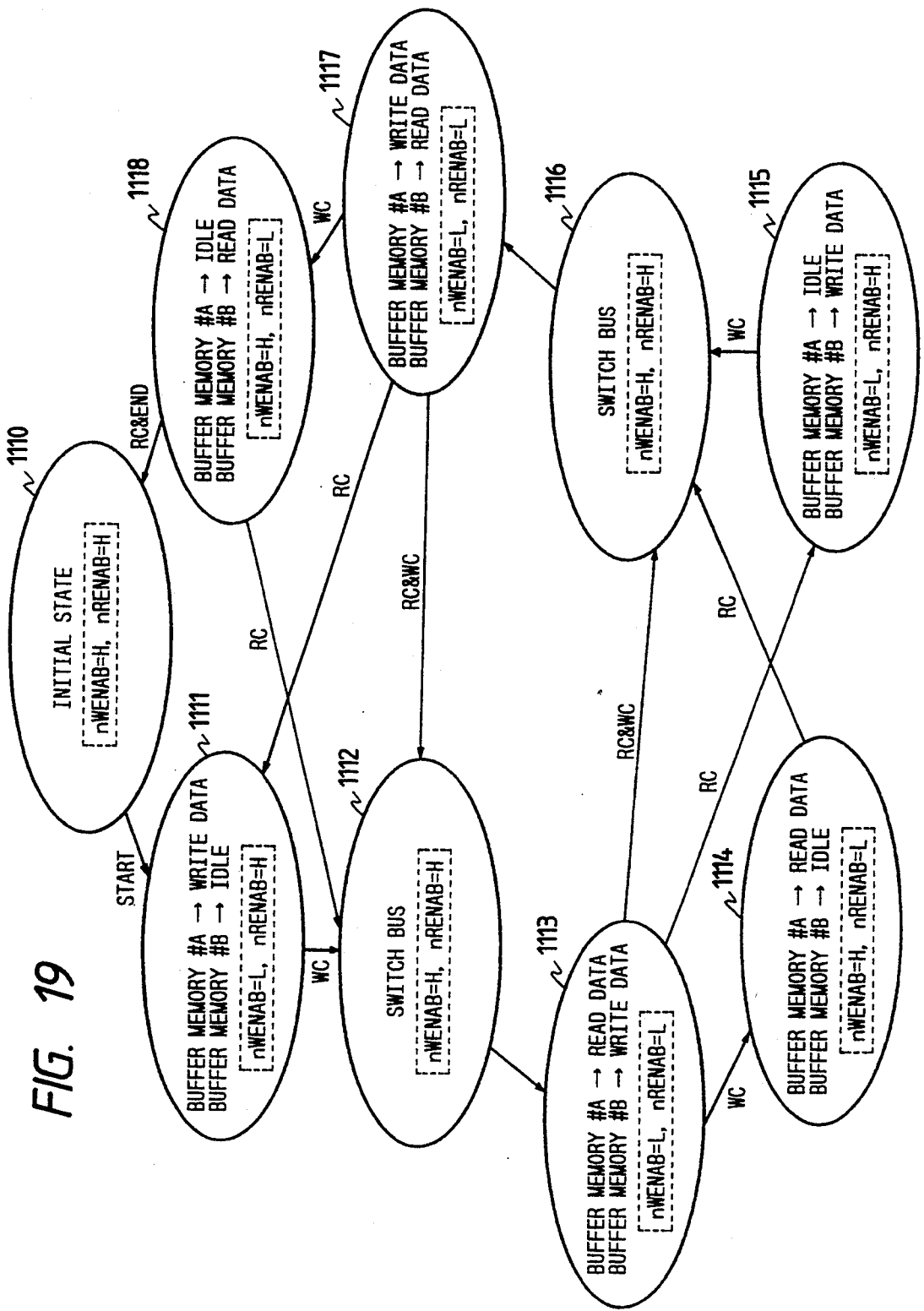
FIG. 19 shows a state transition diagram illustrating control of image data writing/reading in a buffer memory embodying the present invention.

FIG. 19 is a state transition diagram of the operation of writing and reading image data in the buffer memory.

Reference numeral 1110 denotes an initial state in which a write enable signal nWENAB for controlling the operation of the buffer memory-write address generating circuit 1011 and the read enable signal nRENAB for controlling the operation of the buffer memory-read address generating circuit 1012 are set to H. When a signal START for starting the rotational process is then asserted, a state 1111 is followed.

In the state 1111, the buffer memory-write address generating circuit 1011 operates since the write enable signal nWENAB of the buffer memory-write address generating circuit 1011 has been asserted to L and (W/N) lines of input image data are written to the buffer memory #A9. However, the buffer memory 1010 remains idle. The buffer memory-write address generating circuit 1011 generates (W/N) lines of write addresses and as the write completion signal WC from the buffer memory-write address generating circuit 1011 is asserted by one clock, a state 1112 follows.

In the state 1112, the write enable signal nWENAB and the read enable signal nRENAB are set to H; the multiplexer 1005 switches the address of the buffer memory #A9 to the side of the buffer memory-read address generating circuit 1012; and the multiplexer 1006 switches the address of the buffer memory #B10 to the side of the buffer memory-write address generating circuit 1011 and also switches the multiplexer 1004 to the read data side of the buffer memory #A9. The state 1112 is then followed by a state 1113.

In the state 1113, the buffer memory #A9 reads data, whereas the buffer memory #B10 writes data, and both the write enable signal nWENAB and the read enable signal nRENAB are asserted to L. The buffer memory-write address generating circuit 1011, started as the write enable signal nWENAB is asserted, generates (W/N) lines of write addresses and then asserts the write completion signal. WC by one clock. The buffer memory-read address generating circuit 1012, started as the read enable signal nRENAB is asserted, generates (W/N) lines of read addresses and then asserts the read completion signal RC by one clock. The state 1113 is followed by a state 1114 when the write completion signal WC that has been asserted is detected or followed by a state 1115 when the read completion signal RC is detected or otherwise followed by a state 1116 when both the write completion signal WC and the read completion signal RC that have been asserted are detected.

In the state 1114, the buffer memory #B10 remains idle, though the buffer memory #A9 is reading data (nRENAB=L). The state 1114 is followed by the state 1116 when the read completion signal RC that has been asserted is detected.

In the state 1115, the buffer memory #A9 remains idle, though buffer memory #B10 is writing data (nWENAB=L). The state 1115 is followed by the state 1116 when the write completion signal WC that has been asserted is detected.

In the state 1116, the write enable signal nWENAB and the read enable signal nRENAB are set to H; the multiplexer 1005 switches the address of the buffer memory #A9 to the side of the buffer memory,write address generating circuit 1011; and the multiplexer 1006 switches the address of the buffer memory #B10 to the side of the buffer memory-read address generating circuit 1012 and also switches the multiplexer 1004 to the read data side of the buffer memory #B10. The state 1116 is then followed by a state 1117.

In the state 1117, the buffer memory #A9 is writes data, whereas the buffer memory #B10 reads data, and both the read enable signal nRENAB and the write enable signal nWENAB are asserted to L. The state 1117 is followed by a state 1118 when the write completion signal WC that has been asserted is detected or followed by the state 1111 when the read completion signal RC is detected or otherwise followed by the state 1112 when both the write completion signal WC and the read completion signal RC that have been asserted are detected.

In the state 1118, the buffer memory #A9 remains idle, though buffer memory #B10 is reading data (nRENAB=L). The state 1118 is followed by the state 1112 when the read completion signal RC that has been asserted is detected or returned to the initial state 1110 when both the read completion signal RC and a total input image data read completion signal END that have been asserted are detected.

FIG. 20 is a diagram illustrating the order in which addresses are generated by the buffer memory-write address generating circuit 1011. In this case, the order of addresses to be generated in the buffer memories #A9, #B10 is the same and the address Y:X in FIG. 20 indicates that the high order $LOG_2$ (W/N) bit of the write address expresses the value Y and the low order LOG2 (NF×N/B) bit expresses the value X. Initially, a write address (W/N−1):(NF×N/B−1) is generated and then addresses are generated by carrying out decrement by one (NF×N/B−1) times. When the address (W/N−1):0 is reached, the value of the high order $LOG_2$ (W/N) bit of the address is then decremented by one and the value of low order $LOG_2$ of the address is returned to (NF×N/B−2) to generate an address (W/N−2):(NF×N/B−1) ant further decrement by one is carried out (NF×N/B−1) times. Thus, addresses are generated as shown in FIG. 20 and when an address 0:0 is generated, the write completion signal WC is asserted.

FIG. 21 illustrates the order in which the read address of the buffer memory is generated when the rotational angles are 0° and 180°. In this case, the order of addresses to be generated in the buffer memories #A9, #B10 is the same and the address Y:X in FIG. 21 indicates that the high order $LOG_2$ (W/N) bit of the read address expresses the value Y and the low order $LOG_2$ (NF×N/B) bit expresses the value X. Initially, a read address (W/N−1):(NF×N/B−1) is generated and then addresses are generated by carrying out decrement by one (NF×N/B−1) times. When the address (W/N−1):0 is reached, the value of the high order $LOG_2$ (W/N) bit is then decremented by one to provide an address (W/N−2):0 and then increment by one is carried out (NF×N/B−1) times to generate addresses to provide an address (W/N−2):(NF×N/B−1). Thus, addresses are generated as shown in FIG. 21 and when an address 0:0 is generated, the read completion signal RC is asserted.

FIG. 22 illustrates the order in which the read address of the buffer memory #A9 is generated when the rotational angles are 90° and 270°. In this case, the read address (W/N−1):(NF×N/B−1) is initially generated and then the value of the high order $LOG_2$ (W/N) bit of the address is decremented by one (W/N−1) times to generate addresses. When an address 0:(NF×N/B−1)

is reached, the value of the high order $LOG_2 (W/N)$ bit of the address is returned to $(W/N-1)$ and then the low order $LOG_2 (NF \times N/B)$ bit of the address is decremented by one to provide an address $(W/N-1):(NF \times N/B-2)$. Thus, addresses are generated as shown in FIG. 22 and when an address 0:0 is generated, the read completion signal RC is asserted.

FIG. 23 illustrates the order in which the read address of the buffer memory #B10 is generated when the rotational angles are 90° and 270°. In this case, the read address $(W/N-1):0$ is initially generated and then the value of the high order $LOG_2 (W/N)$ bit of the address is decremented by one $(W/N-1)$ times to generate addresses. When an address 0:0 is reached, the value of the high order $LOG_2 (W/N)$ bit of the address is returned to $(W/N-1)$ and then the low order $LOG_2 (NF \times N/B)$ bit of the address is incremented by one to provide an address $(W/N-1):1$. Thus, addresses are generated as shown in FIG. 23 and when an address $0:(NF \times N/B-1)$ is generated, the read completion signal RC is asserted.

Out of the 4-bit image data read from the buffer memory #A9 or #B10 in accordance with the read address generated by the buffer memory-read address generating circuit 1012, the image data of the buffer memory on the read side is selected by the multiplexer 1004 before being fed to the word synthesizing circuit 1013.

Figure 24:
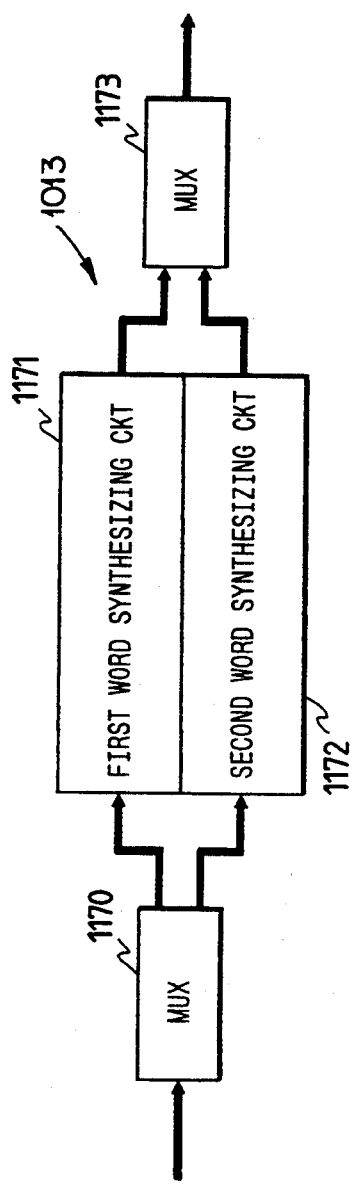
FIG. 24 shows a block diagram of a word synthesizing circuit embodying the present invention.

FIG. 24 is a detailed diagram of the word synthesizing circuit 1013. The 4-bit image data read from the buffer memory involved is fed by a multiplexer 1170 to a first word synthesizing circuit 1171 or a second word synthesizing circuit 1172, depending on the number of information bits N of an input image. The synthetic 8-bit word in the first or second word synthesizing circuit 1013 is selected and output by a multiplexer 1173.

Figure 25:
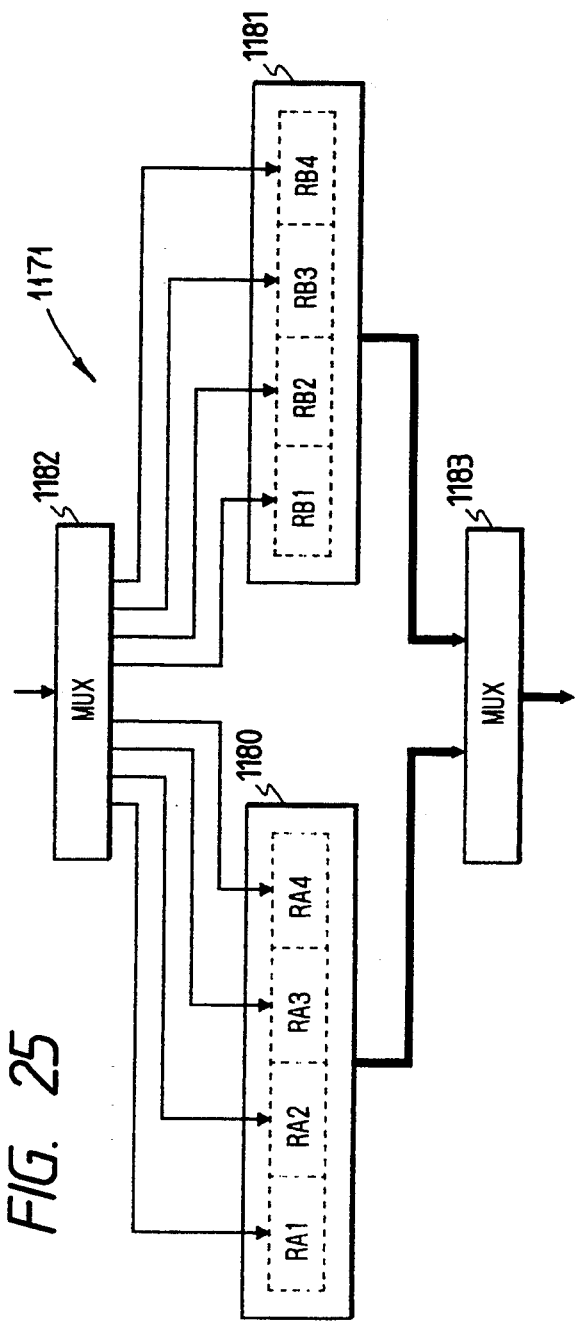
FIG. 25 shows a block diagram of a first word synthesizing circuit embodying the present invention.

FIG. 25 is a detailed diagram of the first word synthesizing circuit 1171 with respect to the input image having the number of information bits N=2. A synthesizing register 1180 is an 8-bit register comprising four register modules RA1 to RA4 capable of designating write enabling in 2-bit units, and a synthesizing register 1181 is an 8-bit register comprising four register modules RB1 to RB4 capable of designating write enabling in 2-bit units likewise. As image data equivalent to two pixels are fed in 4-bit parallel, a multiplexer 1182 divides the image data into data of two bits per pixel and distributes them while exerting write enable control over the modules of the synthesizing registers 1180, 1181 in accordance with the rotational angle as will be described later. When image data are set in both synthesizing registers 1180, 1181, a multiplexer 1183 selects 8-bit word data from the synthesizing registers 1180, 1181 in order and outputs them.

Figure 26:
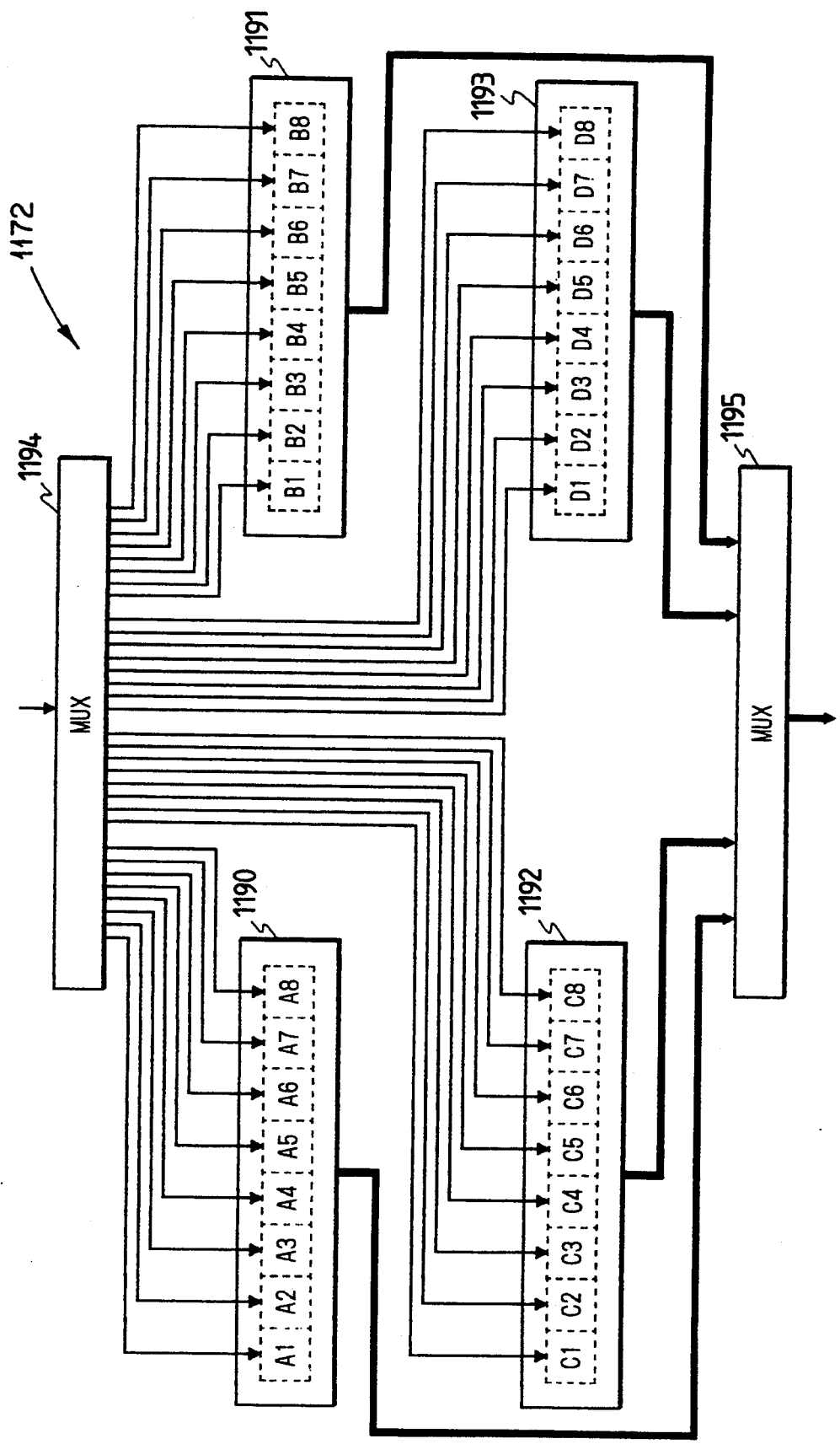
FIG. 26 shows a block diagram of a second word synthesizing circuit embodying the present invention.

FIG. 26 is a detailed diagram of the second word synthesizing circuit 1172 with respect to the input image having the number of information bits N=1. A synthesizing register 1190 is an 8-bit register comprising eight register modules A1 to A8 capable of designating write enabling in 1-bit units. A synthesizing register 1191 is an 8-bit register comprising eight register modules B1 to B8 capable of designating write enabling in 1-bit units. A synthesizing register 1192 is an 8-bit register comprising eight register modules C1 to C8 capable of designating write enabling in 1-bit units. A synthesizing register 1193 is a 8-bit register comprising eight register modules D1 to D8 capable of designating write enabling in 1-bit units. As image data equivalent to four pixels is fed in 4-bit parallel, a multiplexer 1194 divides the image data into data of one bits per pixel and distributes them while exerting write enable control over the modules of the synthesizing registers 1190, 1191, 1192, 1193 in accordance with the rotational angle. When image data are set in all the synthesizing registers with four 8-bit word data thus generated, a multiplexer 1195 selects 8-bit word data from the synthesizing registers 1190, 1191, 1192, 1193 in order and outputs them.

A word synthesizing register corresponding to the number of information bits N of different input images may be arranged with only B/NMIN pieces of W-bit registers on condition that the multiplexer is arranged in such a way as to make N/NMIN pieces of register modules write enable in accordance with the number of information bits N of the input image with respect to B/NMIN pieces of W-bit registers respectively comprising register modules capable of designating write enabling in NMIN bit units corresponding to the minimum value NMIN (NMIN=1 in this case) of the number of information bits of the input image.

FIGS. 27 and 28 illustrate control processes under which the first word synthesizing circuit 1171 sets image data. More specifically, control is exercised until all the data are set in the two 8-bit word synthesizing circuits after the four 4-bit image data read from the buffer memory are fed and this operation is continued until all the input images are combined into an 8-bit word. While the rotational angles are 0° and 180°, the control of the image data differs as to the even or odd line of the input image (the start line is assumed to be an odd line). Reference numeral 1201 refers to data control in a case where the image data is on the odd line when the rotational angles are 0° and 180°. To start with, 2-bit data of two pixels included in 4-bit image data are to be respectively named D0, D1. However, D0 represents a pixel on the high order bit side, that is, input pixel data on the start side. When the 4-bit data is fed, D0, D1 therein are respectively set in RA1, RA2. Subsequently, the next 4-bit image data (D2, D3) are respectively set in RA3, RA4 and the following 4-bit image data (D4, D5) are respectively set in RB1, RB2. Still following 4-bit image data (D6, D7) are respectively set in RB3, RB4. Reference numeral 1202 refers to data control in a case where the image data is on the even line when the rotational angles are 0° and 180°. Further, reference numeral 1203 refers to data control exerted when the rotational angle is 90° counterclockwise (no difference in control between the even and odd lines). In addition, reference numeral 1204 refers to data control exerted when the rotational angle is 270° counterclockwise (no difference the control between the even and odd lines).

With respect to the control of image data in the second word synthesizing circuit 1172, it is exercised until four 8-bit word synthesizing circuits are supplied with data after eight 4-bit image data read from the buffer memory are fed and this operation is continued until the input images are combined into the 8-bit words, respectively. As the way of setting the image data is readily understandable from FIGS. 27 and 28, the description thereof will be omitted.

The address of the data combined by the word synthesizing circuit 1013 into the 8-bit word is written to a page memory 1016 in such a way that it is generated by the page memory-write address generating circuit 1014. Data and address are made by the control circuit 1020 to correspond to each other and the result is transferred to the page memory interface 1015. The page memory interface effects a handshake transfer for the data to be written to the page memory 1016.

Figure 29:
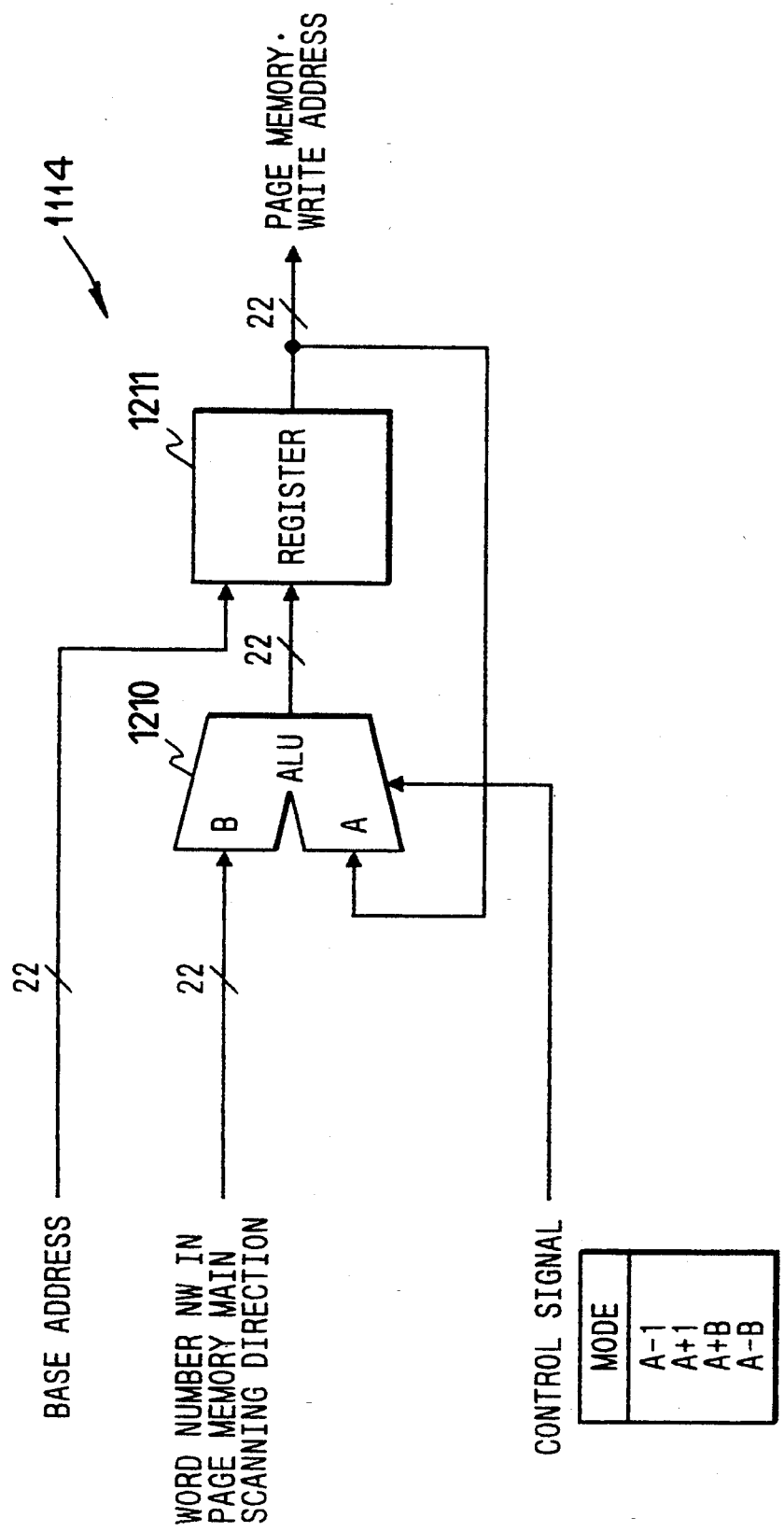
FIG. 29 shows a block diagram of a page memory-write address generating circuit embodying the present invention.

FIG. 29 illustrates the page memory-write address generating circuit 1014. Prior to starting the rotational process, a 22-bit register 1211 is loaded with the base address of the page memory 1016 set in the register 1018 from CPU 1017 and stored therein. Reference numeral 1210 denotes an ALU and the width in the main scanning direction of the page memory set and stored in the register 1018 from CPU, that is, the number of words NW is fed to the input B. Moreover, ALU 1210 is controlled by the control signal applied by the control circuit 1020 in accordance with the rotational angle and operates on A−1, A+1, A−B, A+B modes. The result thus obtained is stored in the register 1211.

Figure 30:
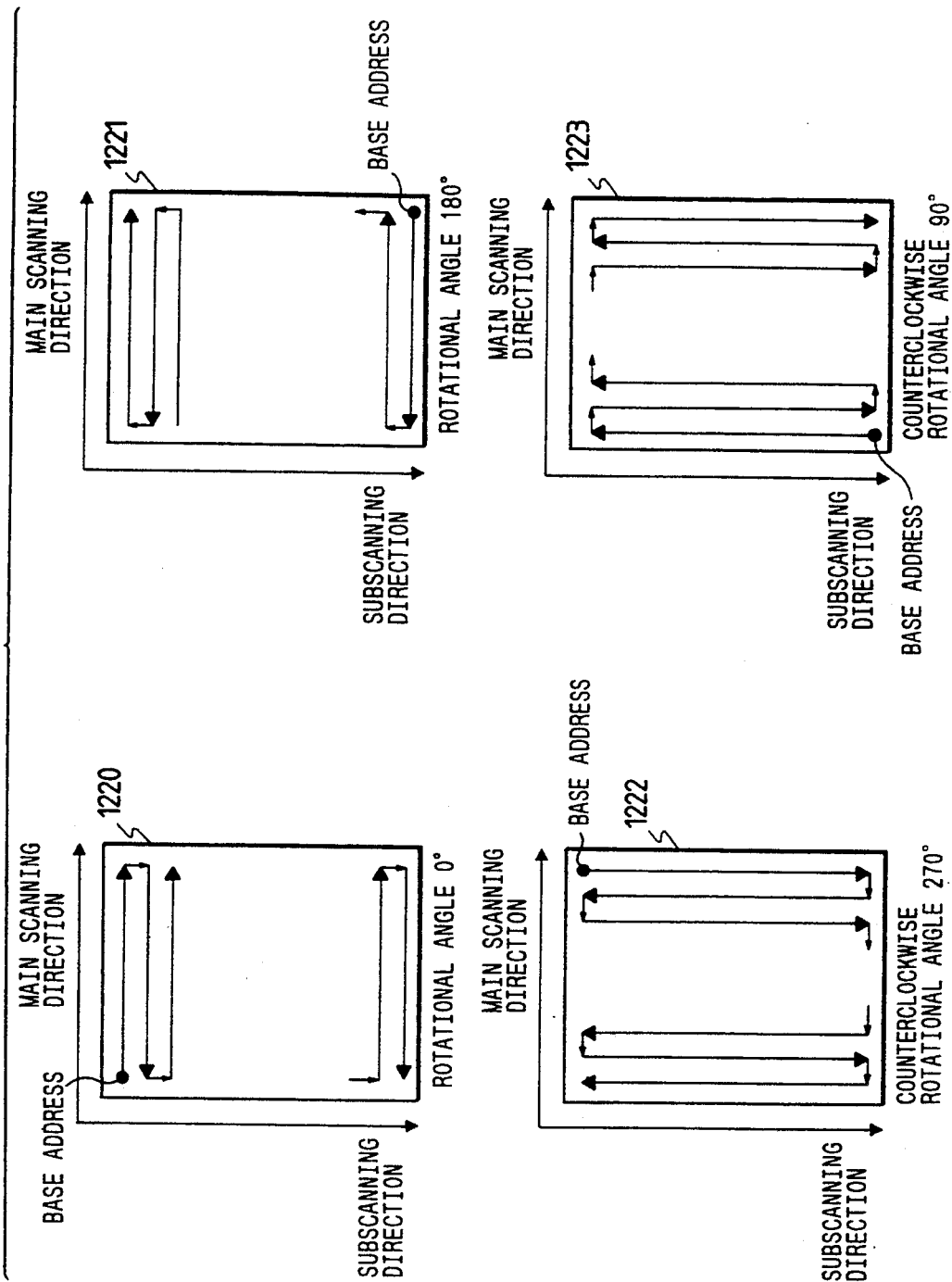
FIG. 30 shows a diagram illustrating the order in which write addresses are generated by the page memory-write address generating circuit according to the present invention.

FIG. 30 is a diagram illustrating the order in which addresses are generated by the page memory-write address generating circuit 1014. The base address that CPU 1017 sets is transferred from the CPU as an address to which the word data, including the initial pixel of the input image is written, is stored in the register 1018. When the address directed to the main scanning is generated in the main scanning direction, as shown in FIG. 30, ALU 1210 is so controlled as to operate on A+1, the mode; when the address directed to the opposite scanning is generated in the main scanning direction, ALU 1210 is so controlled as to operate on A−1 the mode; when the address directed to subscanning is generated in the subscanning direction, ALU 1210 is so controlled as to operate on A+B the mode; and when the address directed to the opposite subscanning is generated in the subscanning direction, ALU 1210 is so controlled as to operate on A−B the mode. Reference numeral 1220 refers to the order in which the write address of the page memory at a rotational angle of 0° is defined; 1221 refers to the order in which the write address of the page memory at a rotational angle of 180° is defined; 1222 refers to the order in which the write address of the page memory at a counterclockwise rotational angle of 270° is defined; and 1223 refers to the order in which the write address of the page memory at a counterclockwise rotational angle of 90° is defined.

The image rotated by a desired rotational angle is generated in the page memory in conformity with the aforementioned rotational process. Although the images different in the number of information bits per pixel have been employed, the present invention is not limited to the embodiments shown above but may apply to various kinds of images.

Although control has been exercised over the address of the buffer memory by controlling the generation of the address in conformity with the rotational angle, the present invention is not restricted to this control method. It is needless to say that it is possible to control not only the generation of a write address but also the read and write addresses in conformity with the rotational angle according to the present invention. Although the down counter and the up/down counter have been used to control the address of the buffer memory according to the present invention, the present invention is not limited to this application but may be applicable to the use of an up counter simultaneously with an up/down counter.

As described above, according to the present invention, image data is stored in the buffer memory once before being subjected to the rotational process. When the ratio of bit width of the image data to bit width per word in the page memory is n, the access speed to the page memory is reducible up to 1/n. While the image data is being rotated in real time, what is fed from an image input unit can therefore be stored in the page memory at relatively high speed. As a result, just one page can be made enough for the size of the page memory needed for effecting the rotational process.

Further, the image rotating apparatus according to the present invention is capable of rotating images different in the number of information bits per pixel in real time and also delaying access time to any memory device for use as a buffer memory with the effect of reducing not only the equipment production cost but also heat generation therefrom. Moreover, the circuit arrangement can be made compact as only one kind of buffer memory is sufficient for an image to be rotated even when it is different from another in the number of information bits per pixel.

What is claimed is:

1. An image rotating apparatus comprising:
   control means for setting an image rotational angle and image area size;
   means for rotating image data, sequentially fed, by the image rotational angle set by said control means; and
   a page memory for storing the image data rotated by said image rotating means;
   said image data rotating means comprising:
   storage means for temporarily storing the sequentially fed image data;
   image data read means for reading the image data stored in said storage means from a first designated address in accordance with the image rotational angle set by said control means; and
   image data write means for writing the image data read by said image data read means to a second designated address in said page memory in accordance with the rotational angle,
   wherein said storage means comprises first and second buffer memories, the sequentially fed image data being alternately written to said first and second buffer memories every predetermined number of lines and wherein said image data reading means reads image data alternately from said first and second buffer memories every predetermined number of lines.

2. An image rotating apparatus as claimed in claim 1, wherein bit width n per pixel of the image date and bit width m of one word in the page memory are written to said first and second buffer memories every m/n lines and said image data read means reads m/n lines of image data written to said first or second buffer memories alternately and sequentially from said first designated address in accordance with the set rotational angles for every word in the page memory on an m/n line basis.

3. An image rotating apparatus as claimed in claim 1, wherein said image data rotating means further comprises an angle register and an area register, wherein the image rotational angle and the image area size are set by said control means in said angle register and area register.

4. An image rotating apparatus as claimed in claim 1, further comprising a buffer write control unit for generating a buffer switching signal for switching said first buffer memory to said second buffer memory and said second buffer memory to said first buffer memory in synchronization with a line synchronizing signal and a write signal to said buffer memories in synchronization with an image clock signal, and a buffer write address generating unit for generating an address to be written to said buffer memories.

5. An image rotating apparatus as claimed in claim 4, wherein said buffer write control unit includes a 3-bit counter for generating a buffer switching signal every eight lines.

6. An image rotating apparatus as claimed in claim 5, wherein said buffer write address generating unit includes a 3-bit counter for generating a Y address and a 13-bit counter for generating an X address.

7. An image rotating apparatus as claimed in claim 1, wherein said image data reading means includes a buffer read control unit and a buffer read address generating unit.

8. An image rotating apparatus as claimed in claim 7, wherein said buffer read address generating unit includes a 3-bit counter for generating a Y address, a 13-bit counter for generating an X address, and a comparator for comparing an output of the 13-bit counter with an X-direction area size.

9. An image rotating apparatus as claimed in claim 1, wherein said image data write means includes a first up/down counter for counting image clock signals in accordance with the area size in an X direction, a second up/down counter for counting image clock signals in accordance with the area size in a Y direction, and operational means for obtaining a page memory address from an output of one of said first and second up/down counters.

10. An image rotating apparatus as claimed in claim 1, wherein said image rotating means rotates the image data by one of 0°, 90°, 180° and 270°.

11. An image rotating apparatus comprising:
control means for setting an image rotational angle and image area size;
image rotating means for rotating a plurality of image data, sequentially fed, by the rotational angle set by said control means;
a page memory for storing the image data rotated by said image rotating means;
said image rotating means comprising:
storage means for temporarily storing the sequentially fed image data;
image data read means for reading the image data stored in said storage means from a first designated address in accordance with the image rotational angle set by said control means;
synthesizing means for reconstructing the image data having a plurality of pixels that have been read by said image data read means corresponding to the rotational angle and the number of bits per pixel; and
image data write means for writing the image data reconstructed by said synthesizing means to a second designated address in said page memory in accordance with the rotational angle,
wherein each pixel has N bits, said storage means having B-bit word width for at least storing W/N lines of image data when said page memory has W-bit word width and wherein said synthesizing means synthesizes word data having B/N pieces of W bits from image data having W/N pieces of B-bit words, where N≦B,≦W, W mod B=0, B mod N=0.

12. An image rotating apparatus as claimed in claim 11, wherein said synthesizing means synthesizes word data having B/N pieces of W bits each time said image data read means reads image data having W/N pieces of B-bit words.

13. An image rotating apparatus as claimed in claim 11, wherein said synthesizing means includes B/N pieces of W-bit registers and distributing means for dividing image data read by said image data read means and distributing the divided data to the registers.

14. An image rotating apparatus as claimed in claim 11, further comprising image read means for reading original images to convert the original image to image data.

15. An image rotating apparatus as claimed in claim 11, further comprising a buffer memory, said image data read means including an address counter for designating an address in the buffer memory, wherein said address counter comprises a first counter for counting the number of pixels read in the main scanning direction and a second counter for counting the number of lines read in the subscanning direction and wherein said image data read means combines the counts resulting from said first and second counters to designate an address in said storage means.

16. An image rotating apparatus as claimed in claim 15, wherein said image data read means switches the number of bits counted by said first counter and a count of said second counter in accordance with a number of bits N per pixel.

17. An image rotating apparatus as claimed in claim 11, wherein said image data write means generates addresses of adjoining word data including adjoining pixels on the rotated image.

18. An image rotating apparatus as claimed in claim 11, wherein said image data write means generates addresses of adjoining words in main scanning direction by incrementing or decrementing preceding address by one, given the number of words by of one line in the main scanning direction of the page memory and addresses of adjoining words in a subscanning direction by incrementing or decrementing the preceding address by NW, where N is a number of bits per pixel and W is a number of bits per word of the page memory.

19. An image rotating apparatus as claimed in claim 11, wherein said storage means comprises a first and second buffer memories, the sequentially fed image data being alternately written to said first and second buffer memories every predetermined number of lines and wherein said image data read means alternately reads image data from said first and second buffer memories every predetermined number of lines.

20. An image rotating apparatus as claimed in claim 11, wherein said image data write means respectively generates write addresses of image data on even and odd lines in opposite directions.

* * * * *

UNITED STATES PATENT AND TRADEMARK OFFICE
CERTIFICATE OF CORRECTION

PATENT NO. : 5,384,645
DATED : January 24, 1995
INVENTOR(S) : Ken HASEGAWA et al It is certified that error appears in the above-indentified patent and that said Letters Patent is hereby corrected as shown below:

Column 2,
Attorney, Agent, or Firm, Title Page, Line 1, after "Henderson" insert --,--.

Claim 6, Column 19, Line 7, Change "5" to --4--.

Claim 11, Column 20, Line 2, Change "$N \leqq B, \leqq W,$" to --$N \leq B \leq W,$--

Claim 18, Column 20, Line 41, before "main" insert --a--.

Claim 18, Column 20, Line 42, before "preceding" insert --a--.

Claim 18, Column 20, Line 43, change "by" to --NW--.

UNITED STATES PATENT AND TRADEMARK OFFICE
CERTIFICATE OF CORRECTION

PATENT NO. : 5,384,645
DATED : January 24, 1995
INVENTOR(S) : Ken Hasegawa, et al.

It is certified that error appears in the above-indentified patent and that said Letters Patent is hereby corrected as shown below:

Claim 19, column 20, line 50 delete "a".

Signed and Sealed this

Twentieth Day of June, 1995

Attest:

BRUCE LEHMAN

Attesting Officer     Commissioner of Patents and Trademarks